United States Patent
Ganahl

(10) Patent No.: US 12,344,456 B2
(45) Date of Patent: Jul. 1, 2025

(54) TRANSPORTABLE TEMPERATURE CONTROL MODULE SYSTEM FOR FOOD, BEVERAGE, PHARMACEUTICALS AND MEDICAL

(71) Applicant: Joe Ganahl, Honolulu, HI (US)

(72) Inventor: Joe Ganahl, Honolulu, HI (US)

( * ) Notice: Subject to any disclaimer, the term of this patent is extended or adjusted under 35 U.S.C. 154(b) by 0 days.

(21) Appl. No.: 18/426,188

(22) Filed: Jan. 29, 2024

(65) Prior Publication Data
US 2024/0166423 A1 May 23, 2024

Related U.S. Application Data

(63) Continuation-in-part of application No. 17/838,138, filed on Jun. 10, 2022, which is a continuation-in-part of application No. 17/536,049, filed on Nov. 28, 2021, which is a continuation-in-part of application No. 16/459,795, filed on Jul. 2, 2019, now abandoned.

(60) Provisional application No. 62/694,981, filed on Jul. 7, 2018.

(51) Int. Cl.
*B65D 81/38* (2006.01)
*F25D 17/06* (2006.01)
*H02J 7/00* (2006.01)

(52) U.S. Cl.
CPC ......... *B65D 81/3876* (2013.01); *F25D 17/06* (2013.01); *H02J 7/00032* (2020.01); *H02J 7/0045* (2013.01); *H02J 2207/40* (2020.01)

(58) Field of Classification Search
CPC ...... F25D 11/003; F25D 17/06; F25D 31/005; F25D 2400/40; A47J 36/2483; A47J 47/14; A23L 3/28; B65D 81/3876; H02J 7/00032; H02J 2207/40; H02J 7/0045
See application file for complete search history.

(56) References Cited

U.S. PATENT DOCUMENTS

| | | | |
|---|---|---|---|
| 2002/0194860 A1* | 12/2002 | Goodman | F25D 11/003 62/239 |
| 2014/0041284 A1* | 2/2014 | Nugent | A01M 1/2094 43/132.1 |

FOREIGN PATENT DOCUMENTS

WO WO-2017205431 A1 * 11/2017

\* cited by examiner

*Primary Examiner* — Ibrahime A Abraham
*Assistant Examiner* — Kuangyue Chen
(74) *Attorney, Agent, or Firm* — Edmond DeFrank

(57) ABSTRACT

The embodiments disclose a modular and interchangeable temperature control transport system including an insulated box configured to contain at least one temperature sensitive item from a group of hot food or cold food or medical or pharmaceutical items, a heating module device coupled to the insulated box and having a circulating fan configured to move internal air from the insulated box over a heating element and back into the insulated box for keeping temperature sensitive items above a predetermined safe temperature, a cooling module device having an evaporator plate configured to maintain an adjustable temperature inside the insulated box when activated for keeping temperature sensitive items below a predetermined safe temperature, a port coupled to the insulated box configured to allow interchangeability between the heating and cooling modules, and at least one insulated box removable rechargeable battery configured to provide power to the heating and cooling modules.

14 Claims, 30 Drawing Sheets

TRANSPORTABLE TEMPERATURE CONTROL MODULE SYSTEM FOR FOOD, BEVERAGE, PHARMACEUTICALS AND MEDICAL

CROSS-REFERENCE TO RELATED APPLICATIONS

This Patent Application is a Continuation-In-Part and claims priority to the United States Patent Application entitled: "TRANSPORTABLE FOOD WARMING MODULE METHOD AND DEVICES", U.S. Ser. No. 17/838,138 filed on Jun. 10, 2022, by Joseph Ganahl, which is a Continuation-In-Part of United States Patent Applications entitled: "FOOD WARMING SYSTEM", U.S. Ser. No. 17/536,049 filed on Nov. 28, 2021, by Joseph Ganahl, which is a Continuation-In-Part of United States Patent Application entitled: "FOOD WARMING SYSTEM", U.S. Ser. No. 16/459,795 filed on Jul. 2, 2019, by Joseph Ganahl, which claims priority to U.S. Provisional Patent Application Ser. No. 62/694,981 filed Jul. 7, 2018, entitled "FOOD WARMING SYSTEM", by Joseph Ganahl, all being incorporated herein by reference.

BACKGROUND

Food spoilage is a naturally occurring process. When food is subjected to temperatures in the "danger zone" above 40 degrees F. and below 140 degrees F. the toxins multiply at an exponential rate. The toxins in turn leave bacteria on your food. Bacteria, yeasts, and molds are among the common causes of spoilage and food poisoning. Chilling food helps delay the food poisoning and spoiling process because the toxins grow at a slower rate, thus leaving fewer bacteria, and keeping food safe to eat for a longer period. Many portable containers are available to keep food chilled for some time but no commercial-grade, convenient system exists. One impact of chilling food is that it can impact sensory details such as texture, taste, and smell. Human beings evolved to prefer hot food. Warmth enhances flavor on the sensory papillae of our tongues and heating food boosts its energy value. Dining trends are changing rapidly with consumers desiring healthy meals that are fast and convenient. Grocery curbside/home delivery, catering, and restaurant delivery are driving powerful new food trends that are limited by the ability to maintain safe temperatures. A portable, modular system with interchangeable heating and cooling elements would have a profound impact on the food service industry and consumer health.

Beverages are served hot and cold. The increasing popularity of ordering via app, curbside and home delivery presents many challenges to satisfactory delivery. Transportable solutions for temperature control will solve a major industry challenge.

Pharmaceutical and Medical deliveries can save lives and temperature control can be a vital element. Blood, organs, tissue, and other biological items require strict temperature control to avoid breakdown and cell degradation. Precise control is difficult and can be the difference between success and failure. Even the efficacy of OTC drugs can be significantly affected by temperature. Transport boxes that can control temperature could have life or death consequences.

FIELD OF THE INVENTION

The present invention is generally directed to a portable container for storing in one embodiment a beverage or other liquid content. In another embodiment the portable container is for storing food, prepared meals and other edibles. In yet another embodiment the portable container is for storing pharmaceutical and medical products for transport and deliveries. The portable container includes both heating and cooling capacities to fit the need for the stored materials. The portable container includes both a heating and a cooling temperature control assembly and one or more removable attachable power source modules.

DETAILED DESCRIPTION OF THE INVENTION

In the following description, reference is made to the accompanying drawings, which form a part hereof, and which are shown by way of illustration a specific example in which the invention may be practiced. It is to be understood that other embodiments may be utilized and structural changes may be made without departing from the scope of the present invention.

General Overview

It should be noted that the descriptions that follow, for example, in terms of transportable temperature control system digital application module method and devices are described for illustrative purposes and the underlying system can apply to any number and multiple types of food preparation processes. In one embodiment of the present invention, the transportable temperature control system digital application module method and devices can be configured using different types of foods and beverages The transportable temperature control system digital application module method and devices can be configured to include hard-sided food transport box containers and can be configured to include hard-sided rolling food transport container and can also be configured to carry drinks in a hard-sided drink transport container using the present invention.

DETAILED DESCRIPTION

Figure 1A:
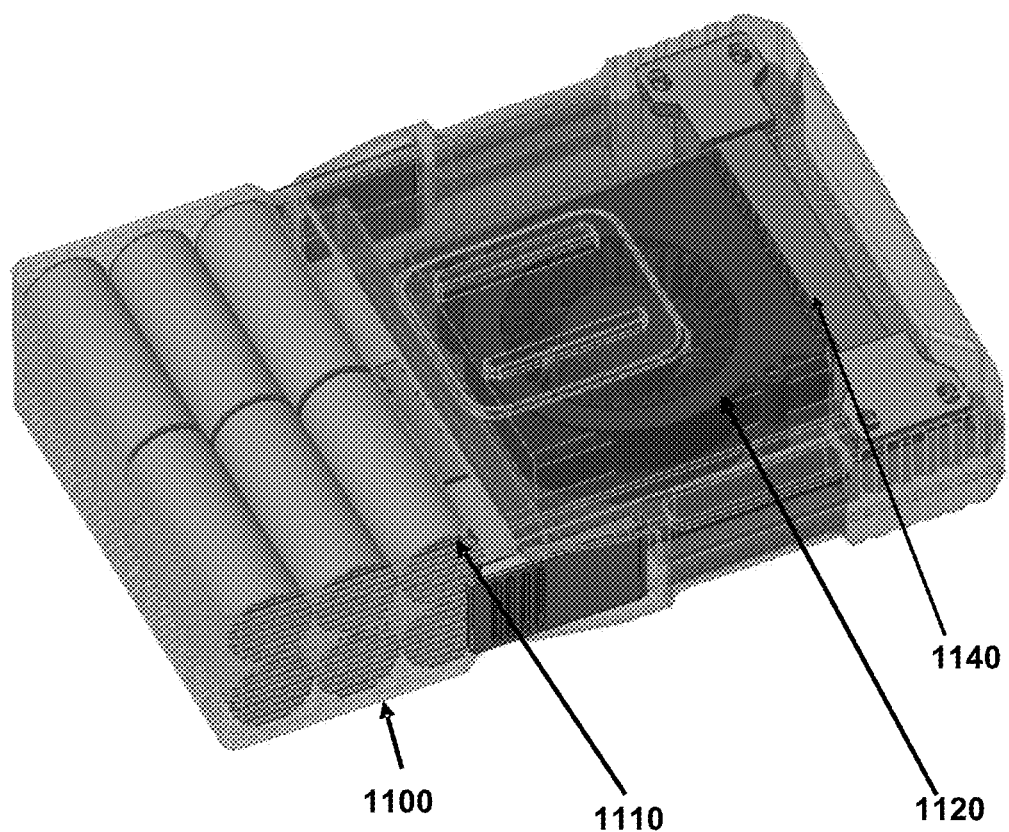
FIG. 1A shows for illustrative purposes only an example of a heating system layout of one embodiment.

FIG. 1A shows for illustrative purposes only an example of a heating system layout of one embodiment. FIG. 1A shows a heating system layout of a heating module 1100 with a battery pack 1110, circulating fan 1120, and heating element 1140

The heating system is a battery-powered device designed to maintain a food-safe temperature of over 140° F. in portable food transport containers. The battery pack 1110 powers the circulating fan 1120 and the heating element 1140. The circulating fan pulls in already heated air from the interior cavity of the transport container, force the air across the heating element for additional temperature gain, and then vent the reheated air back into the transport container. The venting process causes the in one embodiment heated air to circulate inside the transport container, ensuring even distribution of heat across all contained foods.

Figure 1B:
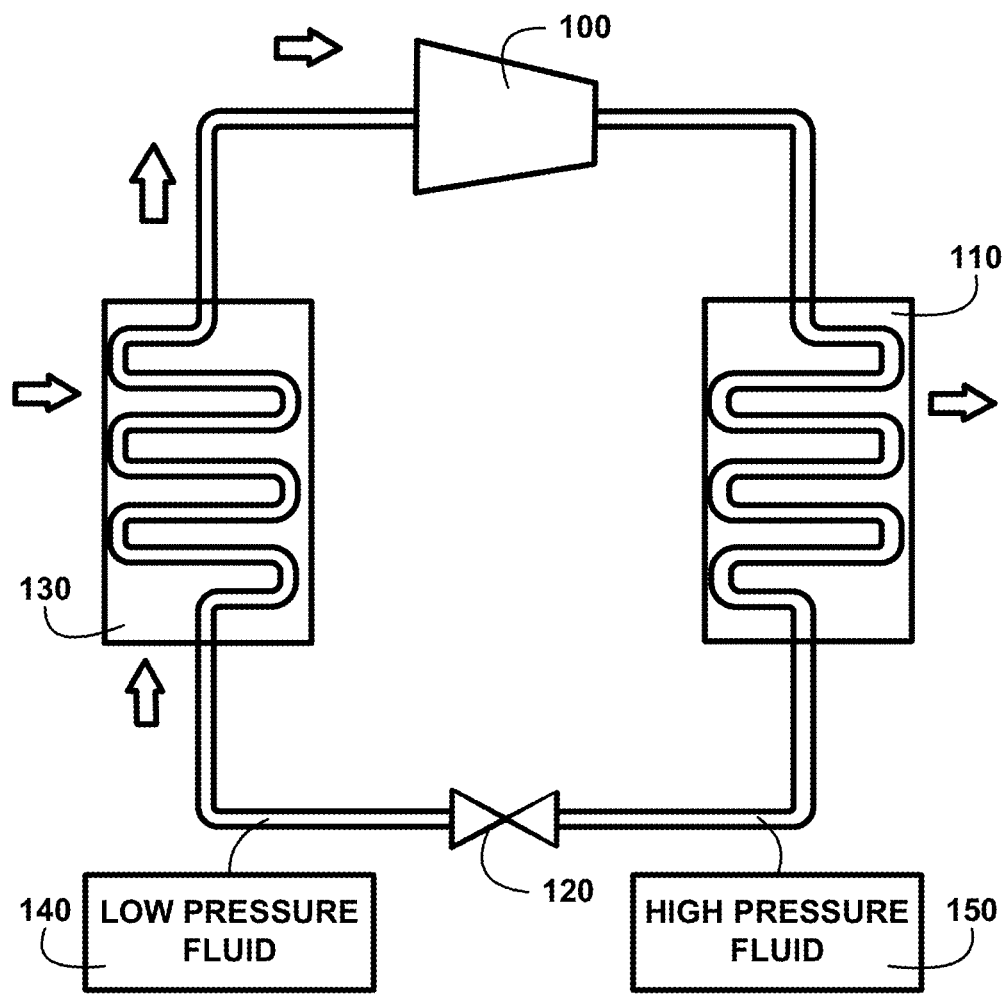
FIG. 1B shows for illustrative purposes only an example of a schematic drawing of a refrigeration system of one embodiment.

FIG. 1B shows for illustrative purposes only an example of a schematic drawing of a refrigeration system of one embodiment. FIG. 1B shows a schematic diagram of the refrigeration system. The compressor 100, condenser 110, expansion valve 120, and battery pack 1110 are located on the outside of the Food or Drink Transport Box, the evaporator 130 coil is located inside. A high-pressure fluid flows from the condenser 110 through the expansion valve 120 and the pressure is reduced to a low-pressure fluid 140 that flows through the evaporator 130 coil.

The heating and refrigerating modular devices are configured to be easily portable so that food can be warmed, chilled, or frozen anywhere. The devices are self-contained, food-safe, and waterproof to prevent damage to the system. Power is supplied by a customized rechargeable battery pack 1110 that is the same for both modules in one embodiment. Other embodiments may add AC power option. Mounting cutouts on doors and covers of the insulated boxes and carts are identical so that the heating and refrigerating modules are interchangeable. Modular construction allows easy interchangeability of devices by the user.

The installation and removal of modules will be aided by a quick-release system between the mounting flange and module body in one iteration.

The food transport boxes, heating, and refrigerating modules have a rugged design to endure the rigors of commercial applications for grocery curbside and home delivery, catering and hospital use, restaurant delivery, and other commercial activities. The unique temperature control system provides broad retail applications as well with the rugged construction suitable for outdoor and recreational activities.

The heating module will maintain a safe temperature of over 140° F. The refrigeration module has an adjustable temperature range under 10° F. for ice cream and frozen foods, and 10-40° F. for chilled foods.

Figure 2A:
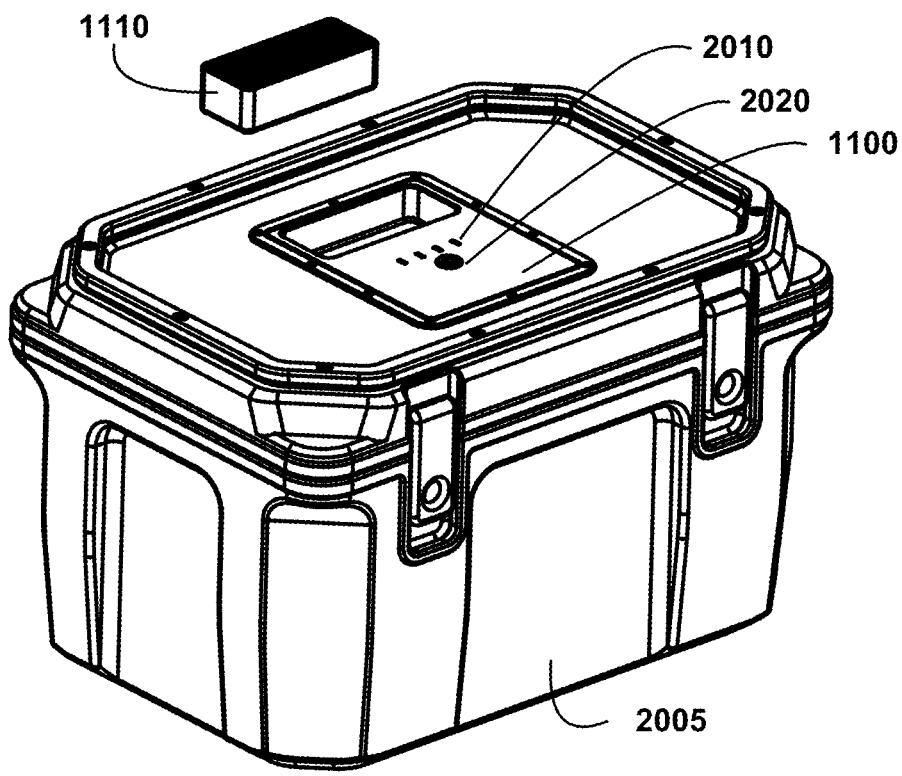
FIG. 2A shows for illustrative purposes only an example of a heating module installed in the cover of an insulated box of one embodiment.

Temperature Control Modules on Insulated Boxes:

FIG. 2A shows for illustrative purposes only an example of a heating module installed horizontally in the cover of an insulated box of one embodiment. FIG. 2A shows the heating module 1100 installed in the cover of an insulated box 2005, with removable battery pack 1110, LED power indicator 2010, and power button 2020. When the power button 2020 is pushed, this will activate the device and begin circulating heated air. The LED power indicator shows the battery charge level.

Figure 2B:
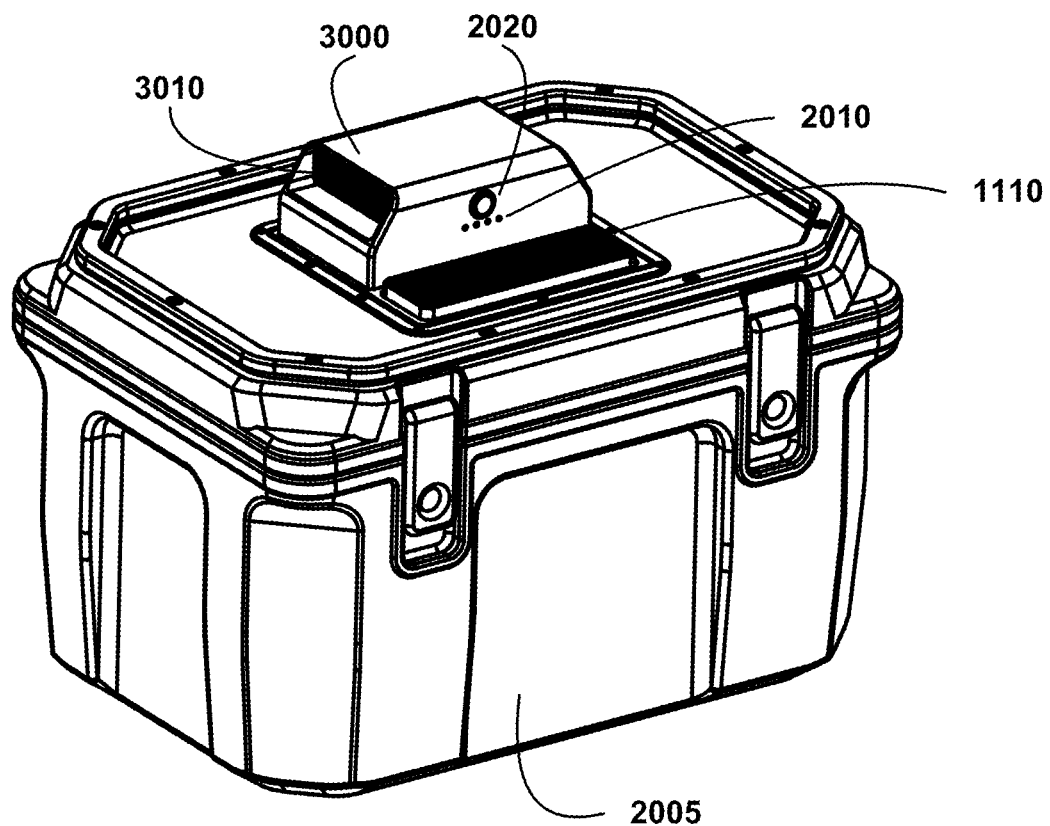
FIG. 2B shows for illustrative purposes only an example of a refrigerating module installed in the cover of an insulated box of one embodiment.

FIG. 2B shows for illustrative purposes only an example of a refrigerating module installed horizontally in the cover of an insulated box of one embodiment. FIG. 2B shows refrigerating module 3000 having a heat exhaust vent 3010 mounted on the cover of insulated box 2005. A removable battery pack 1110 provides power to the system.

The power button 2020 activates the system when it is single pressed, and it also controls temperature settings when double pressed. In one example, an LED power indicator 2010 display an LED lights indicate battery level and in temperature selection mode-selected temperature. In one embodiment, when one LED is lit, this means the temperature is below 10°. When two LEDs are lit, this means the temperature is between 10° and 40°. When three LEDs are lit, this means the temperature is between 40° and 140°. When four LEDs are lit, this means the temperature is over 140°. In another embodiment, the battery level and in temperature selection mode, the selected temperature is indicated using a gauge meter showing the battery charge level and in temperature selection mode shows a temperature as a series of lights along a bar screen with temperature readings. Other indicator components can also be used for these functions.

For cooling, when the power button 2020 is pressed, the compressor will start, which controls the flow of refrigerant. The compressor constricts the refrigerant vapor, raising its pressure, and pushes it into the condenser coils. When the hot gas in the coils meets the cooler ambient air temperature, it becomes a liquid. Now in liquid form at high pressure, the refrigerant cools down as it flows into the evaporator plate inside the insulated box. The refrigerant absorbs the heat inside the box, cooling down the air. The refrigerant evaporates to a gas, then flows back to the compressor, where the cycle starts all over.

Figure 3A:
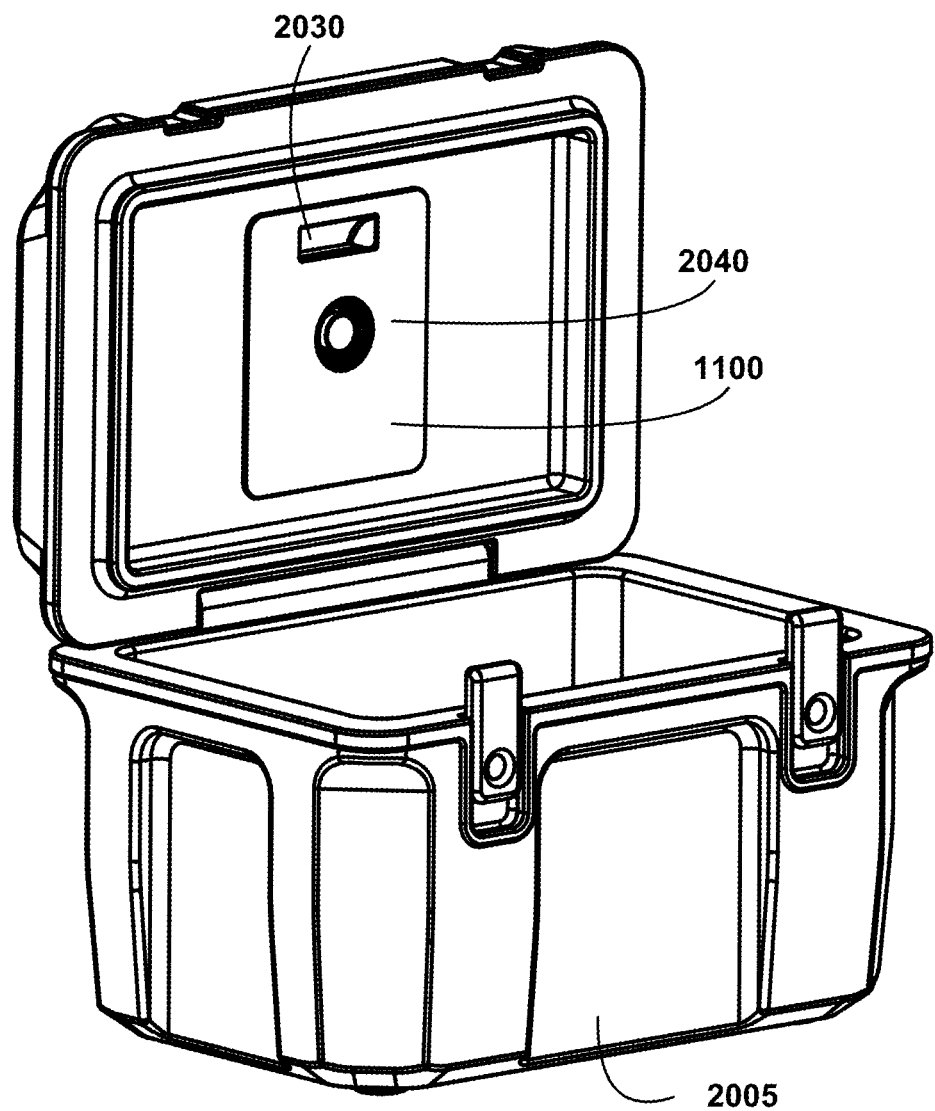
FIG. 3A shows for illustrative purposes only an example of an inside view of a heating module installed in the cover of an insulated box of one embodiment.

FIG. 3A shows for illustrative purposes only an example of an inside view of heating module 1100 installed in the cover of an insulated box 2005 of one embodiment. The circulating fan draws air in through the intake port 2040, passes it over the heating element and returns reheated air to the insulated box via output vent 2030.

Figure 3B:
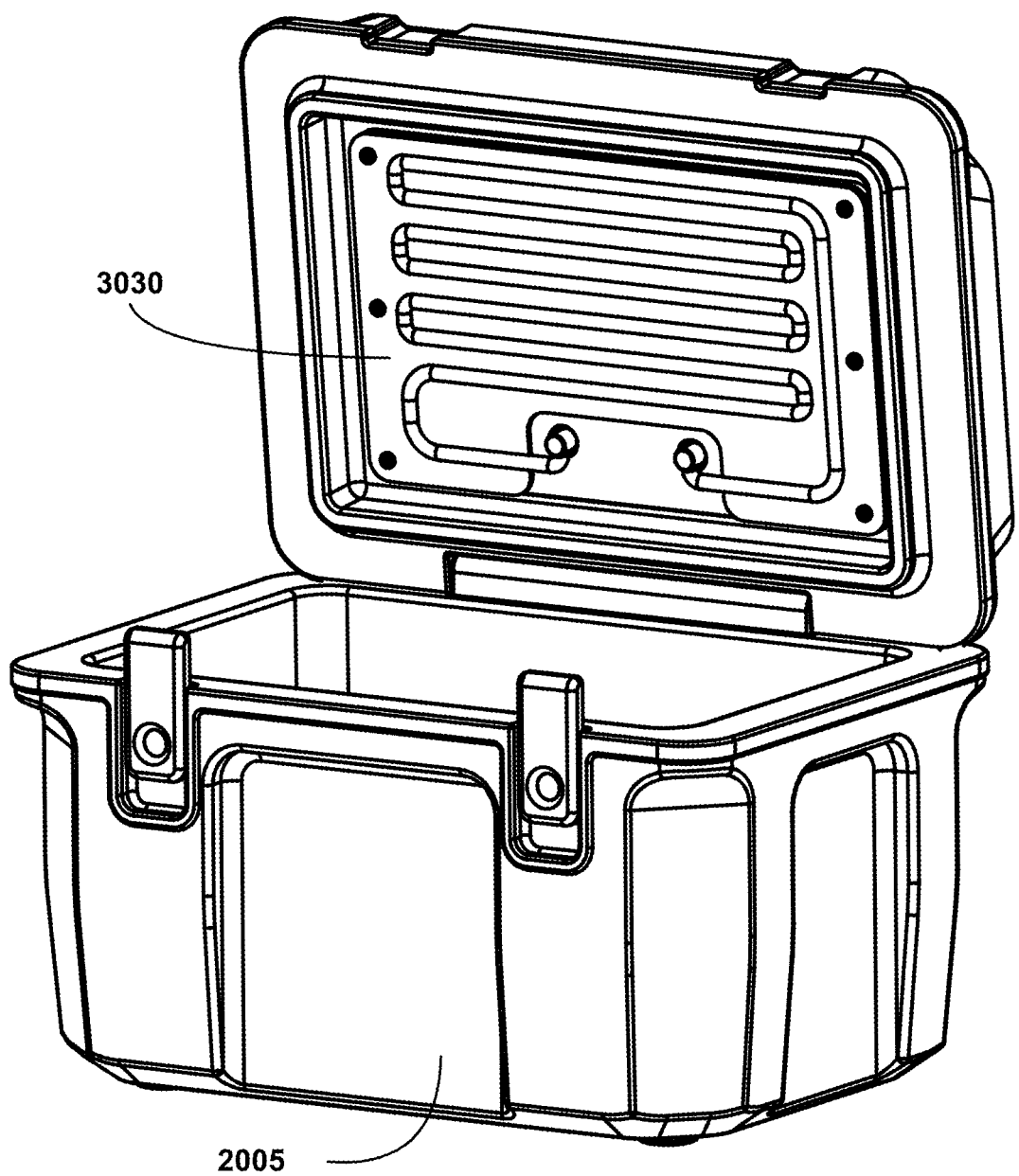
FIG. 3B shows for illustrative purposes only an example of an inside view of a refrigerating module installed in the cover of an insulated box of one embodiment.

FIG. 3B shows for illustrative purposes only an example of an inside view of a refrigerating module installed in the cover of an insulated box of one embodiment. FIG. 3B shows the evaporator plate 3030 mounted to the inside cover of the insulated box 2005. The evaporator plate draws warm air out of the box and cycles through the system, leaving cold air behind. The temperature is controlled by the pressure developed from the compressor.

Figure 3C:
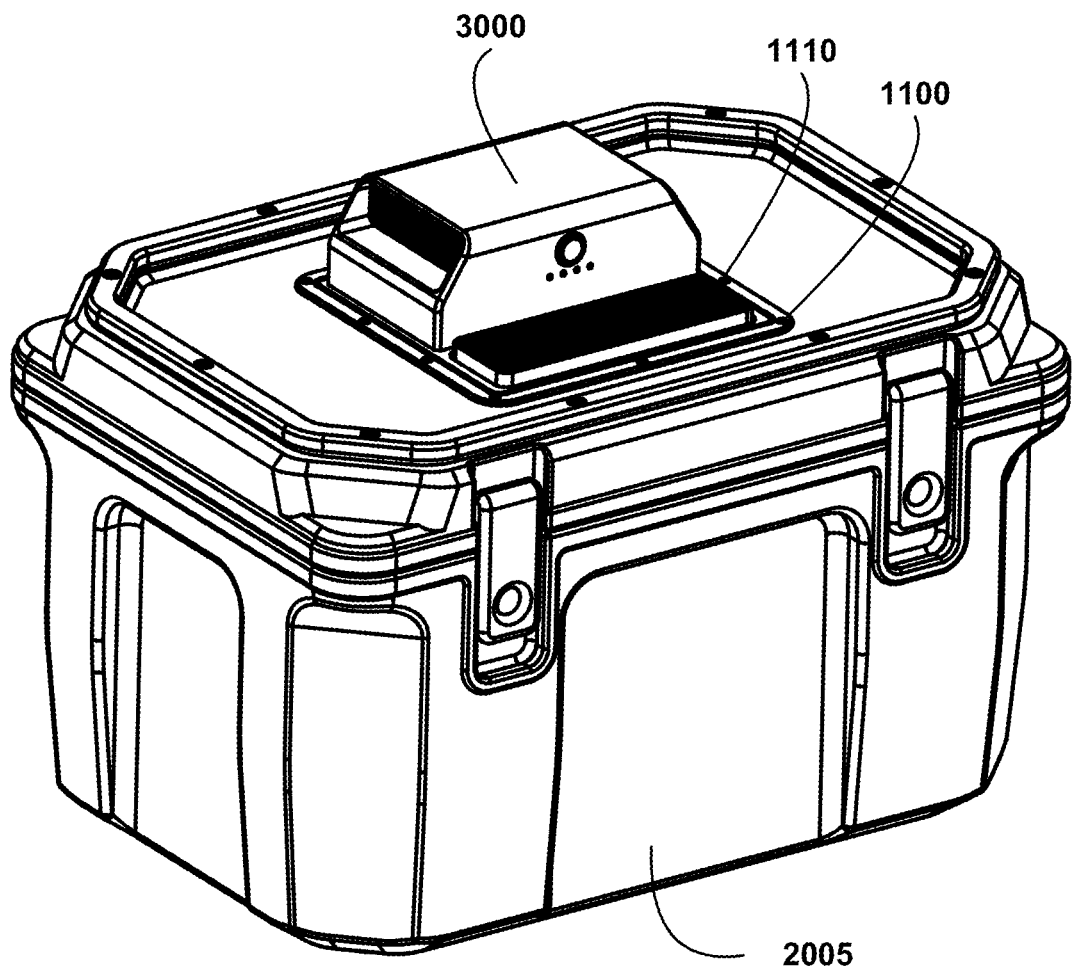
FIG. 3C shows for illustrative purposes only an example of a top view of a heating module and refrigeration module installed in the top of an insulated box of one embodiment.

FIG. 3C shows for illustrative purposes only an example of a top view of a refrigerating and heating module installed in the top of an insulated box. FIG. 3C shows the top of an insulated box 2005 with a Refrigerating module 3000, battery pack 1100 and Heating Module 1110 installed side by side. The battery adapter pack allows both modules to run off one battery and automatically adjust temperature between modules to maintain precise temperature in diverse atmospheric conditions of one embodiment. Other embodiments may include a reversible heat pump with reversible valve allowing the compressor system to switch from cooling to heating of one embodiment.

Figure 3D:
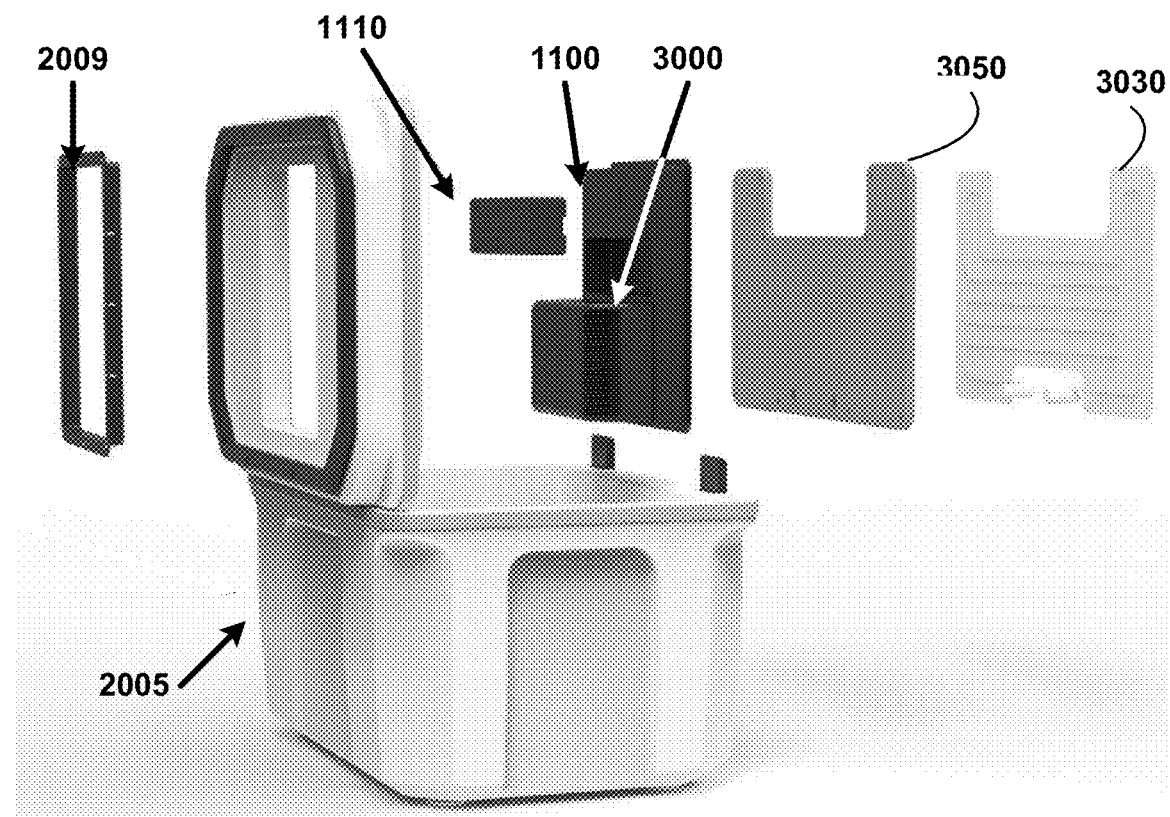
FIG. 3D shows for illustrative purposes only an example of an exploded view of refrigerating and heating module installed in the top of an insulated box of one embodiment.

FIG. 3D shows for illustrative purposes only an example of an exploded view of a refrigerating and heating module installed in the top of an insulated box. FIG. 3D shows the insulated box 2005 with a mounting flange 2009 for securing the temperature module. The battery pack 1100 installs between the Heat Module 1110 and refrigerating modules 3000. The insulating plate 3050 and evaporator plate 3030 attach to the bottom of the module.

In one embodiment, the heating or refrigeration module can be run separately and independently of each other. Whichever device is on will draw power from the battery. In another embodiment, temperature can be set and a sensor will detect ambient internal temperature and automatically activate either heating or refrigeration as needed to maintain set temperature. Other embodiments may include a reversible heat pump with reversible valve allowing the compressor system to switch from cooling to heating.

Figure 3E:
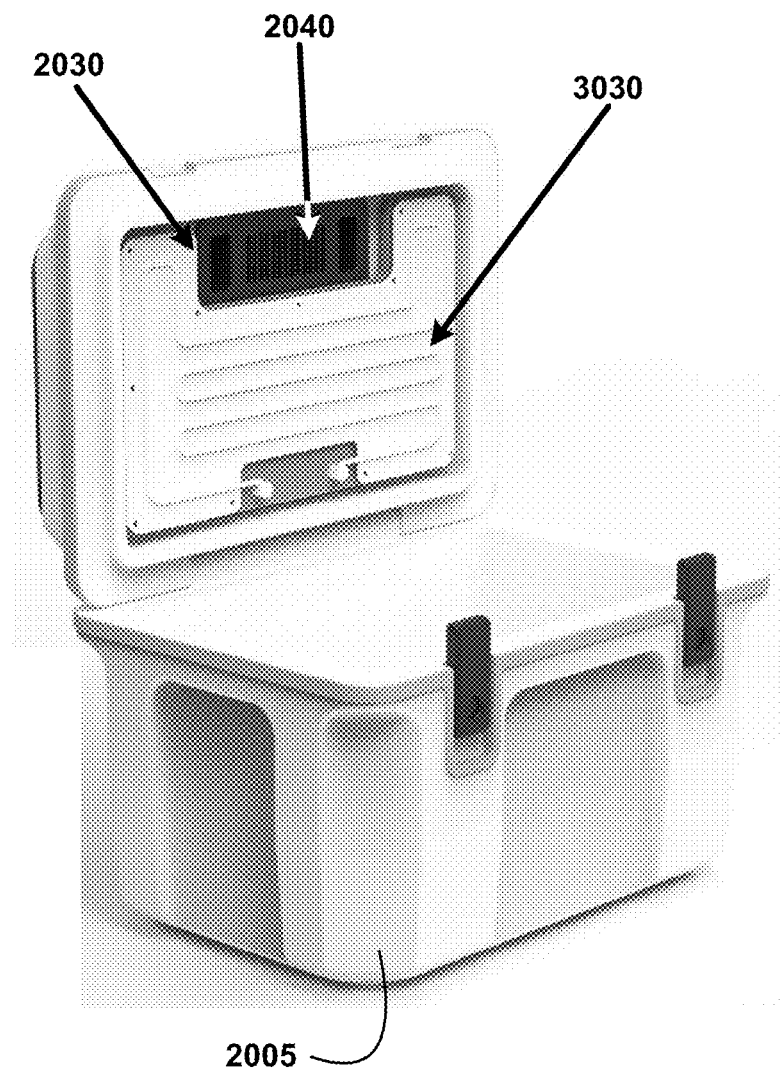
FIG. 3E shows for illustrative purposes only an example of an inner view of refrigerating and heating module installed in the top of an insulated box of one embodiment.

FIG. 3E shows for illustrative purposes only an example of an inner view of a refrigerating and heating module installed on the top of an insulated box of one embodiment. FIG. 3E shows the insulated box 2005 having the heat module output vent 2030 of FIG. 3A, the heat module intake port 2040 of FIG. 3A and the refrigerating module evaporator plate 3030 FIG. 3D shows the insulated box 2005 with a mounting flange 2009 for securing the temperature module. The battery pack 1110 is installed between the heating module 1100 of FIG. 1A and refrigerating modules 3000. The insulating plate 3050 and evaporator plate 3030 attach to the bottom of the module.

In one embodiment, the heating or refrigeration module can be run separately and independently of each other. Whichever device is on will draw power from the battery. In another embodiment, temperature can be set, and a sensor will detect ambient internal temperature and automatically activate either heating or refrigeration as needed to maintain set temperature. Other embodiments may include a reversible heat pump with reversible valve allowing the compressor system to switch from cooling to heating.

Figure 4A:
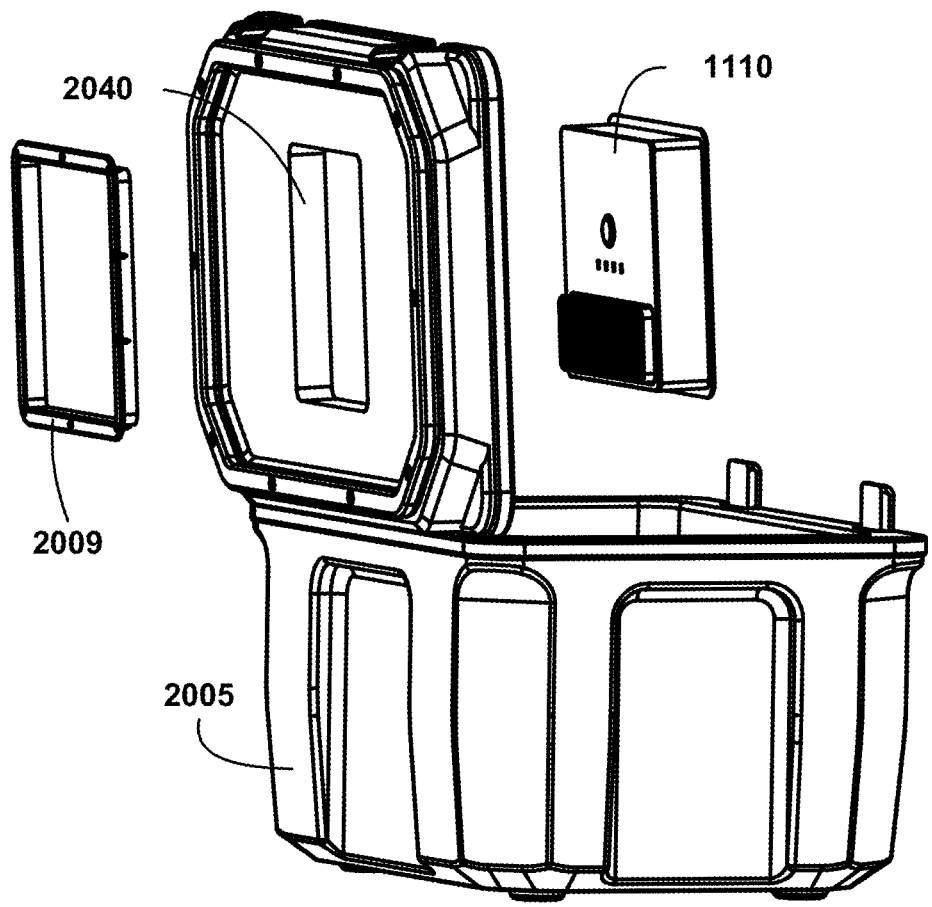
FIG. 4A shows for illustrative purposes only an example of an exploded view of a heating module installed in the cover of an insulated box of one embodiment.

FIG. 4A shows for illustrative purposes only an example of an exploded view of a heating module installed in the cover of an insulated box of one embodiment. FIG. 4A shows the mounting flange 2009, removable battery pack 1110 of FIG. 1A nests into heating module 1100 which is mounted to installation cut out 4040 in the cover of insulated box 2005.

Figure 4B:
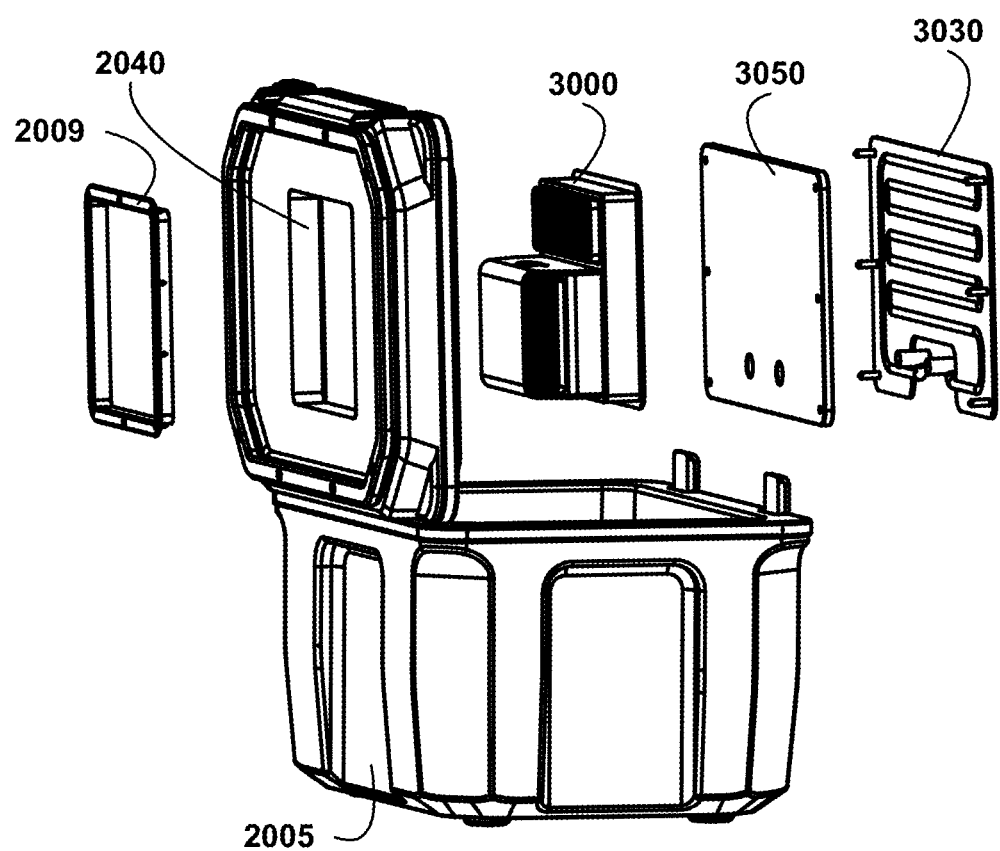
FIG. 4B shows for illustrative purposes only an example of an exploded view of a refrigerating module installed in the cover of an insulated box of one embodiment.

FIG. 4B shows for illustrative purposes only an example of an exploded view of a refrigerating module installed in the cover of an insulated box of one embodiment. FIG. 4B shows the mounting flange 2009 which connects to the refrigerating module 3000 via the installation cut out 4040 in the cover of insulated box 2005. The evaporator plate 3030 connects to the Insulating mount plate 3050 which connects to the refrigerating module 3000 and nests on the inside of the cover of box 2005. Evaporator plate 3030 insulating mount plate 3050 and refrigerating module 3000 are directly connected and form a 1-piece module. Both the heating module 1100 of FIG. 1A and the refrigeration module 3000 utilize the same installation cut out 4040. This allows the modules to be interchangeable with one box able to support either module.

Figure 5A:
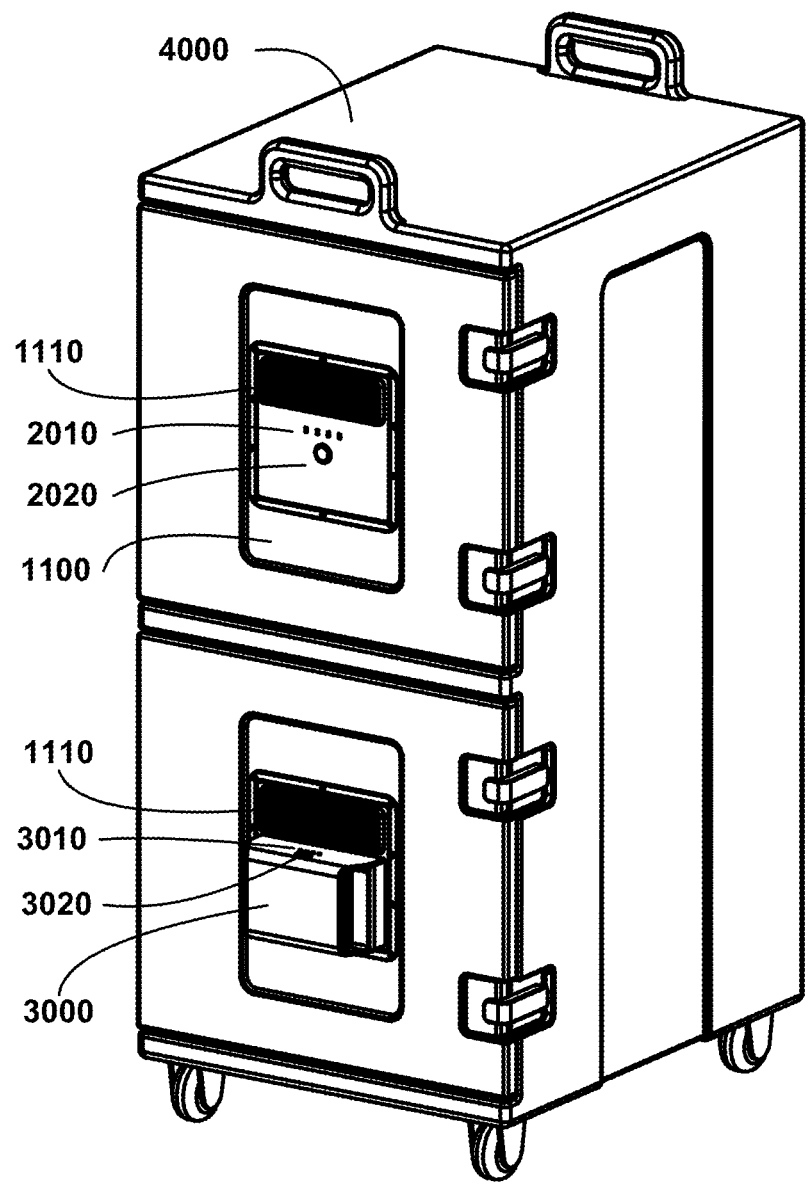
FIG. 5A shows for illustrative purposes only an example of a heating module and a refrigerating module installed in the doors of an insulated cart of one embodiment.

FIG. 5A shows for illustrative purposes only an example of a heating module and a refrigerating module installed in the doors of an insulated food transport crate of one embodiment. FIG. 5A shows a food transport crate 4000 with a heating module 1100 installed vertically in the top door with the battery pack 1110, LED power indicator 2010, and power button 2020. Refrigerating module 3000 was installed vertically in the lower door with battery pack 1110, mount plate 3050, and LED power indicator 3010.

Figure 5B:
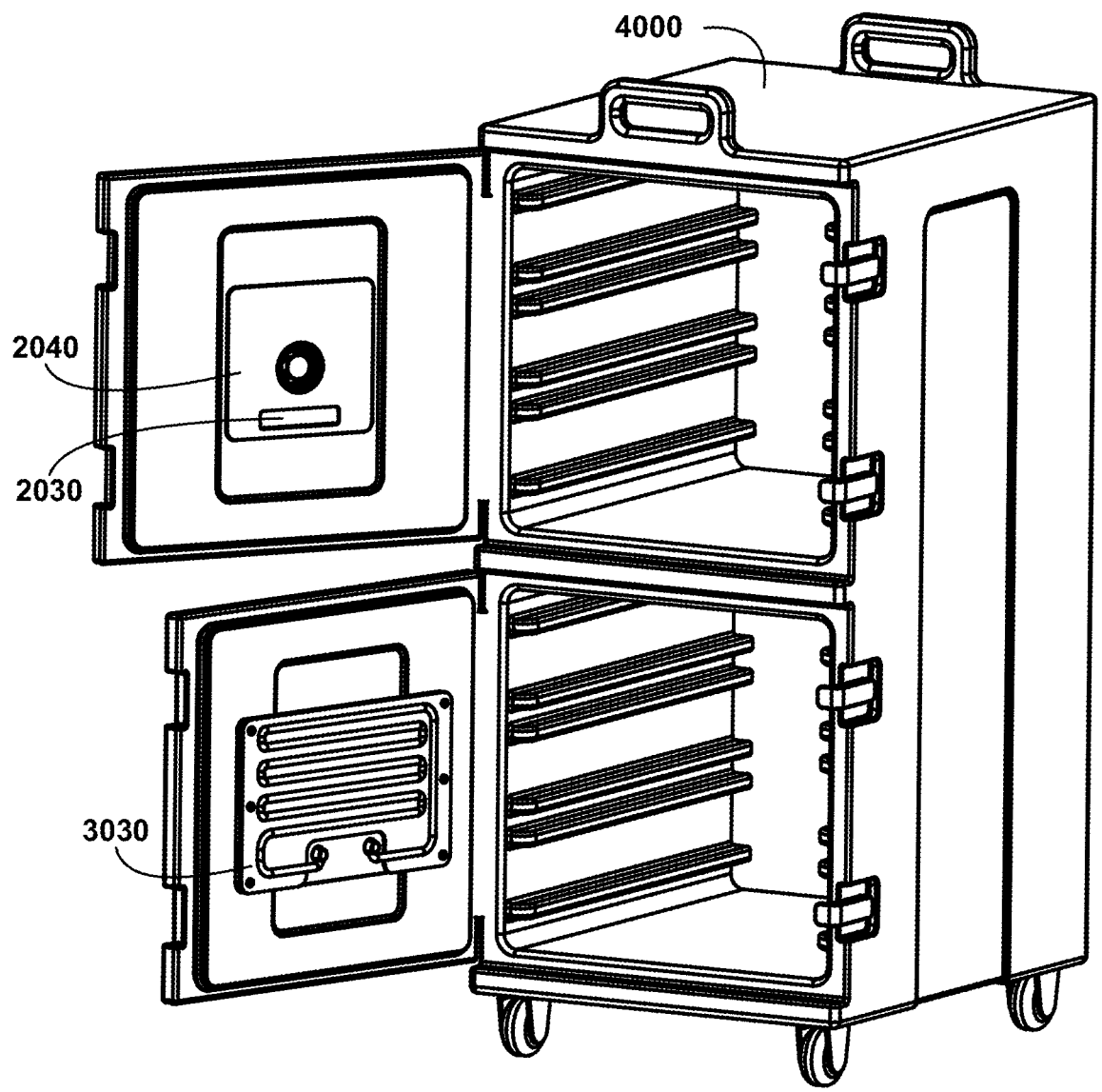
FIG. 5B shows for illustrative purposes only an example of an inner view of a heating module and a refrigerating module installed in the doors of an insulated cart of one embodiment.

FIG. 5B shows for illustrative purposes an example of an inner view of a heating module and a refrigerating module installed in the doors of an insulated food transport crate 4000 of one embodiment. FIG. 5B shows the inside view of heating module 1100 of FIG. 1A mounted vertically in the door of an insulated cart with the intake port 2040 and output vent 2030. Refrigerating module 3000 of FIG. 4B is mounted vertically in the lower door of an insulated cart with evaporator plate 3030.

The heating and refrigerating modular devices are configured to be easily portable so that food can be warmed, chilled, or frozen anywhere. The devices are self-contained, food-safe, and waterproof to prevent damage to the system. Power is supplied by a customized rechargeable battery pack 1110 that is the same for both modules. Mounting cutouts on doors and covers of insulated boxes and carts are identical so that the heating and refrigerating modules are interchangeable. Modular construction allows easy interchangeability of devices by the user. The installation and removal of modules will be aided by a quick-release system between the mounting flange and module body in one iteration.

The food transport boxes, heating, and refrigerating modules have a rugged design to endure the rigors of commercial applications for grocery curbside and home delivery, catering and hospital use, restaurant delivery, and other commercial activities. The unique temperature control system provides broad retail applications as well with the rugged construction suitable for outdoor and recreational activities.

Figure 6A:
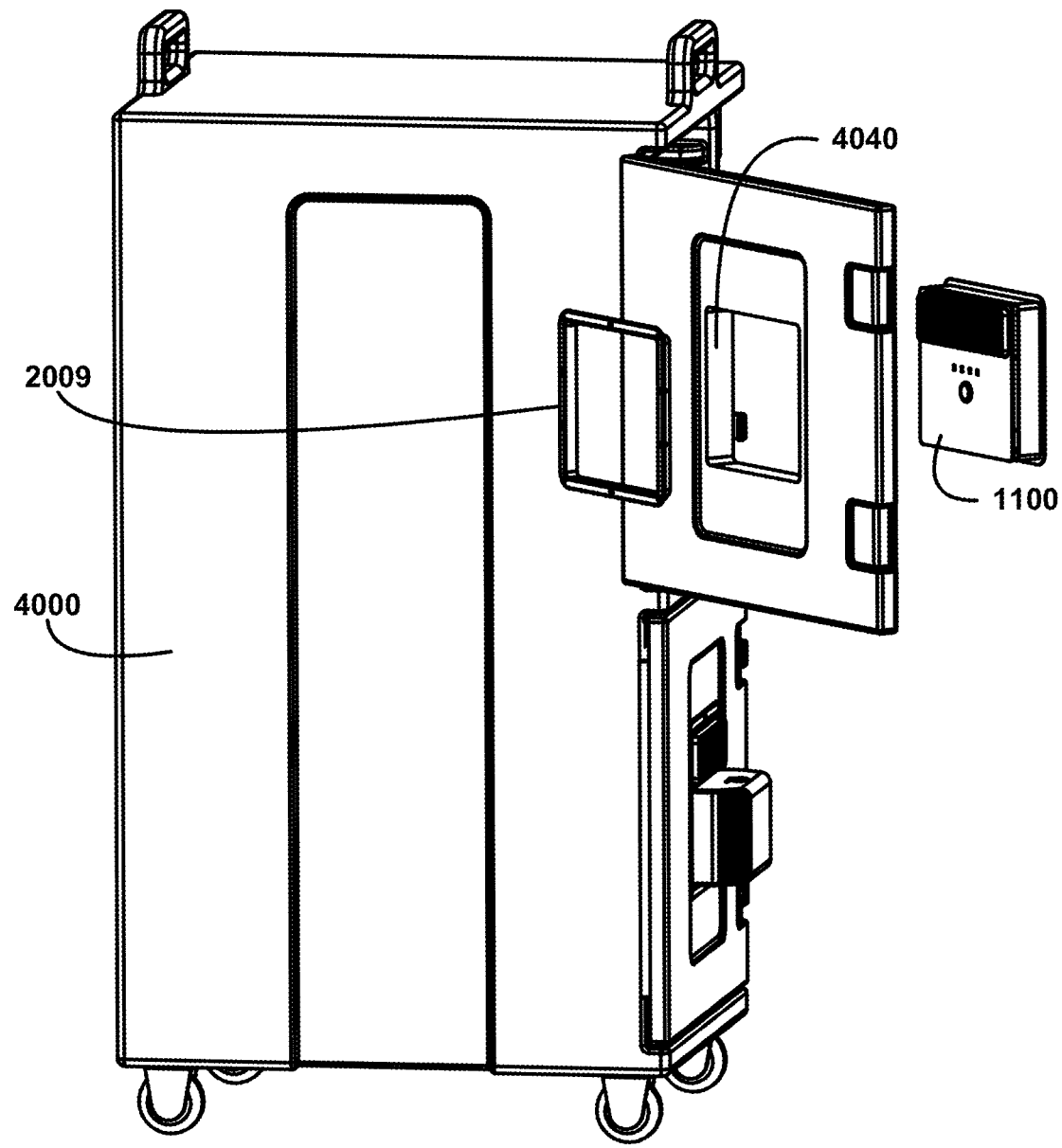
FIG. 6A shows for illustrative purposes only an example of an exploded view of a heating module installed in the door of an insulated cart of one embodiment.

FIG. 6A shows for illustrative purposes only an example of an exploded view of a heating module installed in the door of an insulated food transport crate 4000 of one embodiment. FIG. 6A shows an exploded view of heating module 1100 in a vertical mount position of an insulated food transport crate 4000 door with installation cut out 4040 and mounting flange 2009.

Figure 6B:
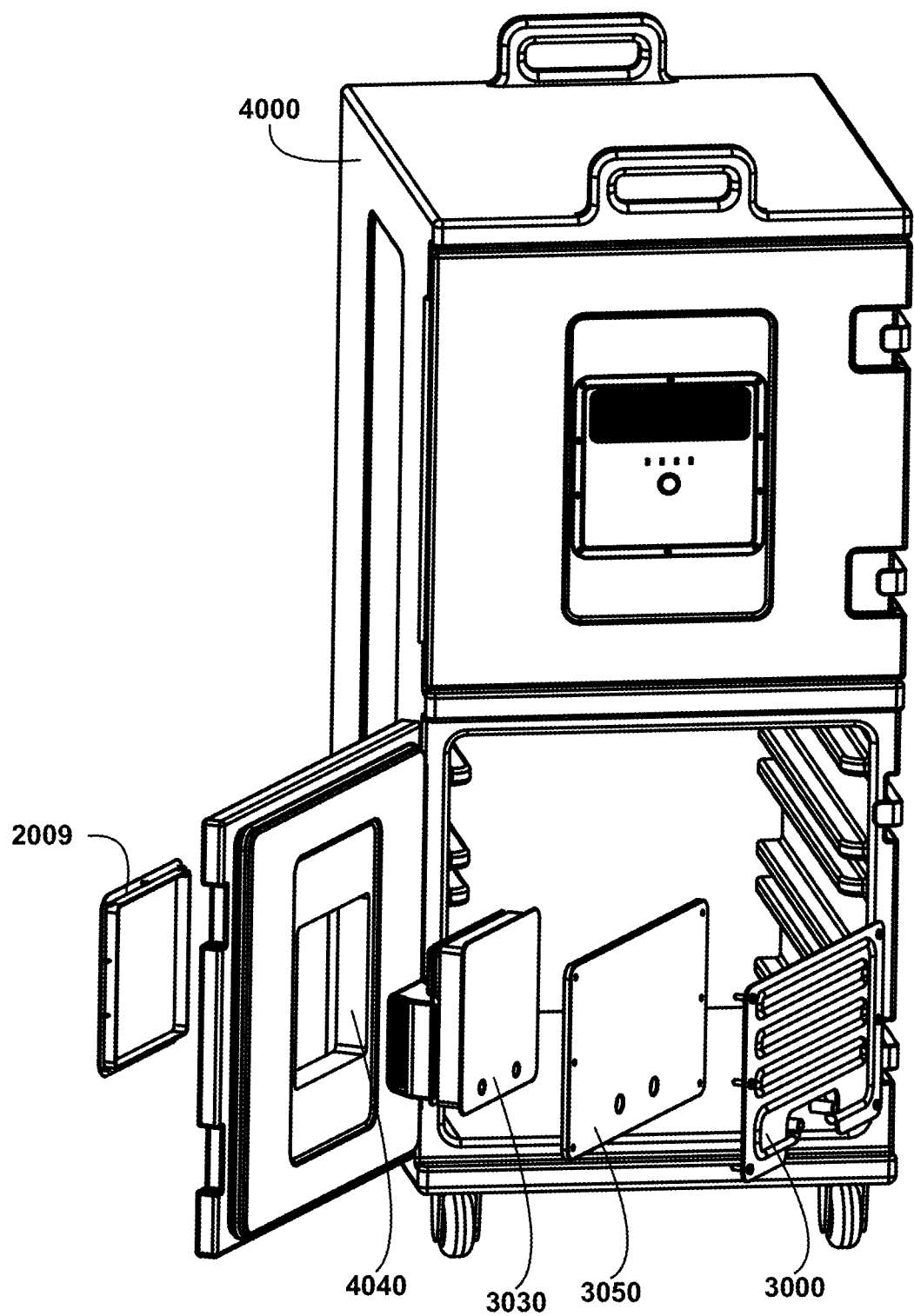
FIG. 6B shows for illustrative purposes only an example of an exploded view of a refrigerating module installed in the door of an insulated cart of one embodiment.

FIG. 6B shows for illustrative purposes only an example of an exploded view of a refrigerating module installed in the door of an insulated cart of one embodiment. FIG. 6B shows an exploded view of refrigerating module 3000 in vertical installation position on the door of insulated food transport crate 4000 with installation cut out 4040, mounting flange 2009, insulating mount plate 3050, and evaporator plate 3030.

Evaporator plate 3030 insulating mount plate 3050 and refrigerating module 3000 are directly connected and form a 1-piece module.

The vertical installation cutouts in a food transport crate are the same for heating module 1100 of FIG. 1A and refrigerating module 3000. The modules can be installed interchangeably so that one crate can be used for either module. In some embodiments, mounting may be to back or side walls.

Hot and Cold Coffee Caddy

Figure 7A:
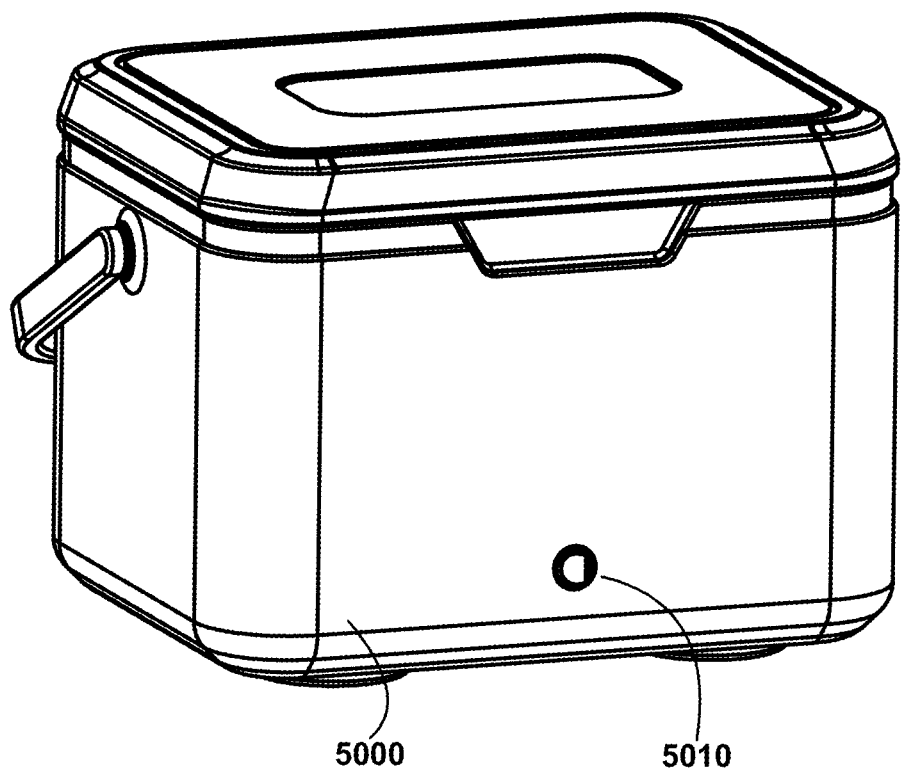
FIG. 7A shows for illustrative purposes only an example of a hot Coffee Caddy of one embodiment.

FIG. 7A shows for illustrative purposes only an example of a hot coffee caddy of one embodiment. FIG. 7A shows an outer view of the hot coffee caddy 5000 with power indicator light 5010.

Figure 7B:
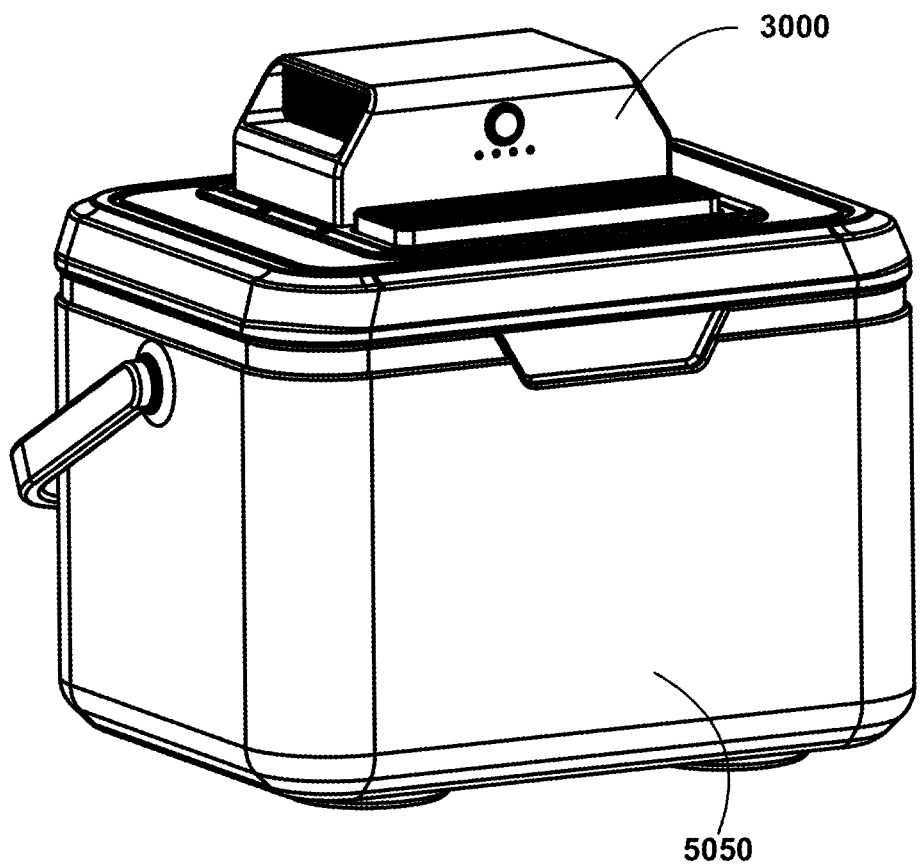
FIG. 7B shows for illustrative purposes only an example of a cold Coffee Caddy of one embodiment.

FIG. 7B shows for illustrative purposes only an example of a cold coffee caddy of one embodiment. FIG. 7B shows an exterior view of a cold coffee caddy 5050 with refrigerating module 3000 horizontally installed in the cover.

Figure 8A:
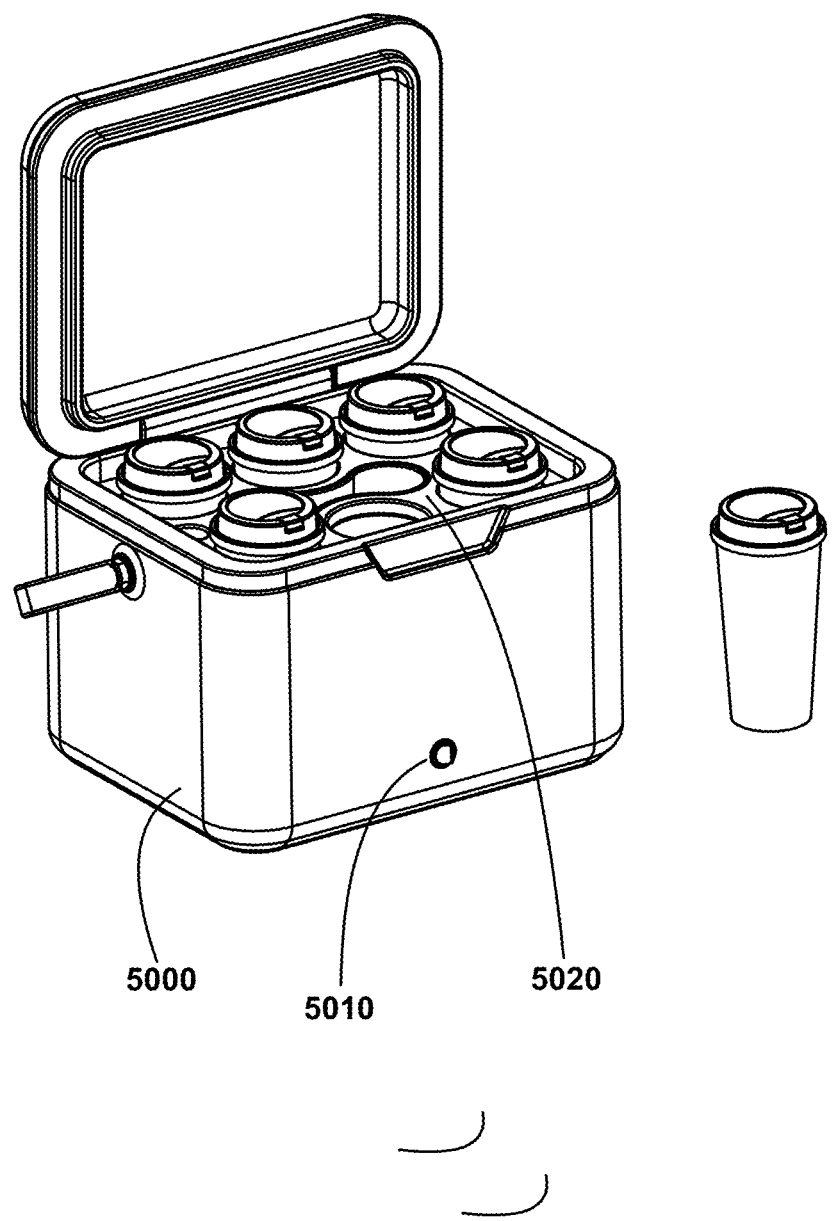
FIG. 8A shows for illustrative purposes only an example of an open hot Coffee Caddy with cups inside of one embodiment.

FIG. 8A shows for illustrative purposes only an example of an open hot coffee caddy with cups inside of one embodiment. FIG. 8A shows an open hot coffee caddy 5000 with cup holder 5020 and power indicator light 5010.

Figure 8B:
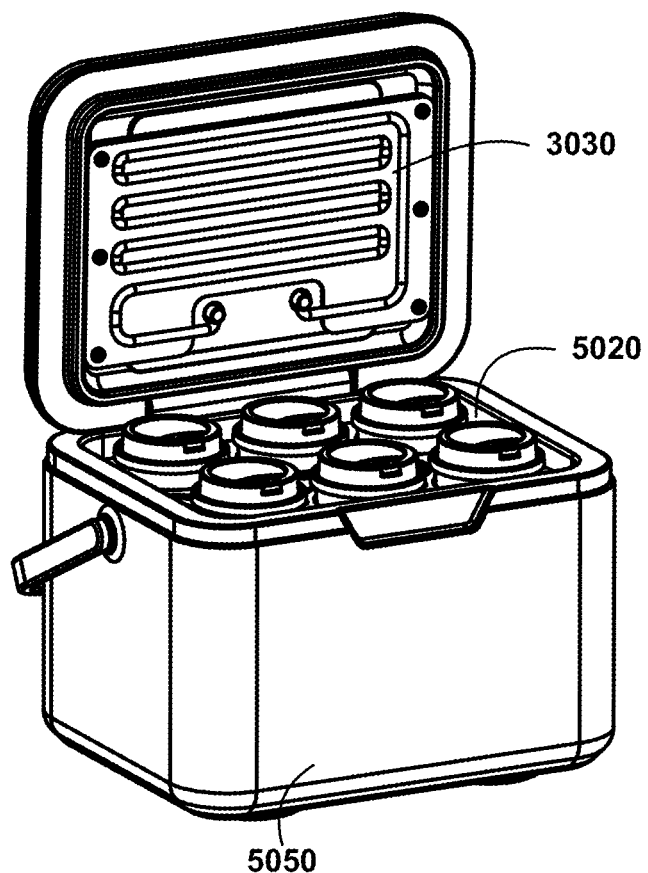
FIG. 8B shows for illustrative purposes only an example of an open cold Coffee Caddy with cups inside of one embodiment.

FIG. 8B shows for illustrative purposes only an example of an open cold coffee caddy with cups inside of one embodiment. FIG. 8B shows an open cold coffee caddy 5050 with evaporator plate 3030 installed inside cover and cup holder 5020.

Figure 9A:
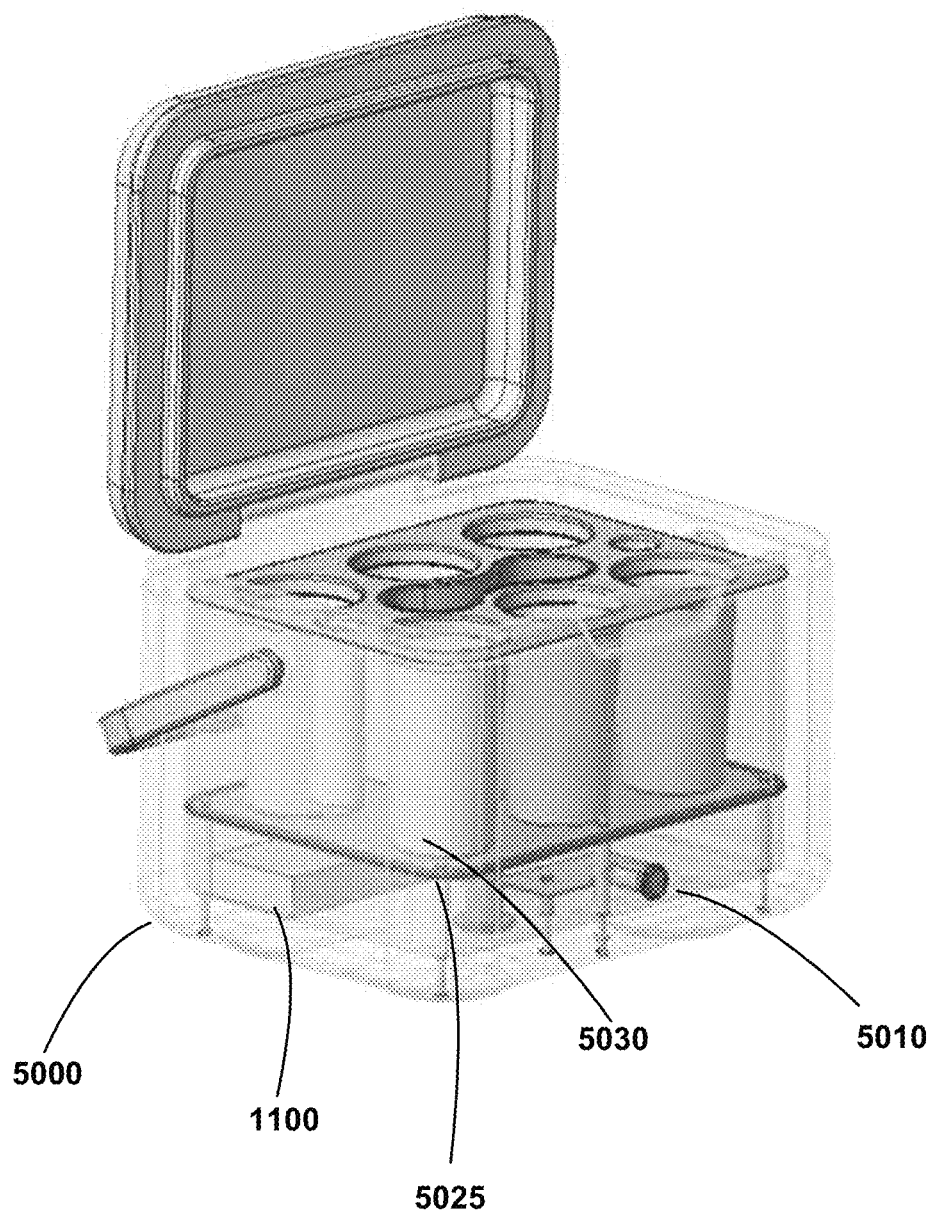
FIG. 9A shows for illustrative purposes only an example of an inner detail of a hot Coffee Caddy of one embodiment.

FIG. 9A shows for illustrative purposes only an example of an inner detail of a hot coffee caddy of one embodiment. FIG. 9A shows the inner detail of the hot coffee caddy 5000 with battery pack 1110, watertight base plate 5025, cup holder with heat film wrapping 5030, and power indicator light 5010. The hot coffee caddy is designed to keep coffee hot while being transported. The battery and control PCBA are protected in a watertight lower compartment that serves as a base for the aluminum cup holders. Each cup holder is wrapped with a heat-transmitting film that transfers heat into the coffee to maintain hot temperatures. The insulated box helps retain heat and provides an easy carry system for the transfer of hot coffee or other hot drinks.

Figure 9B:
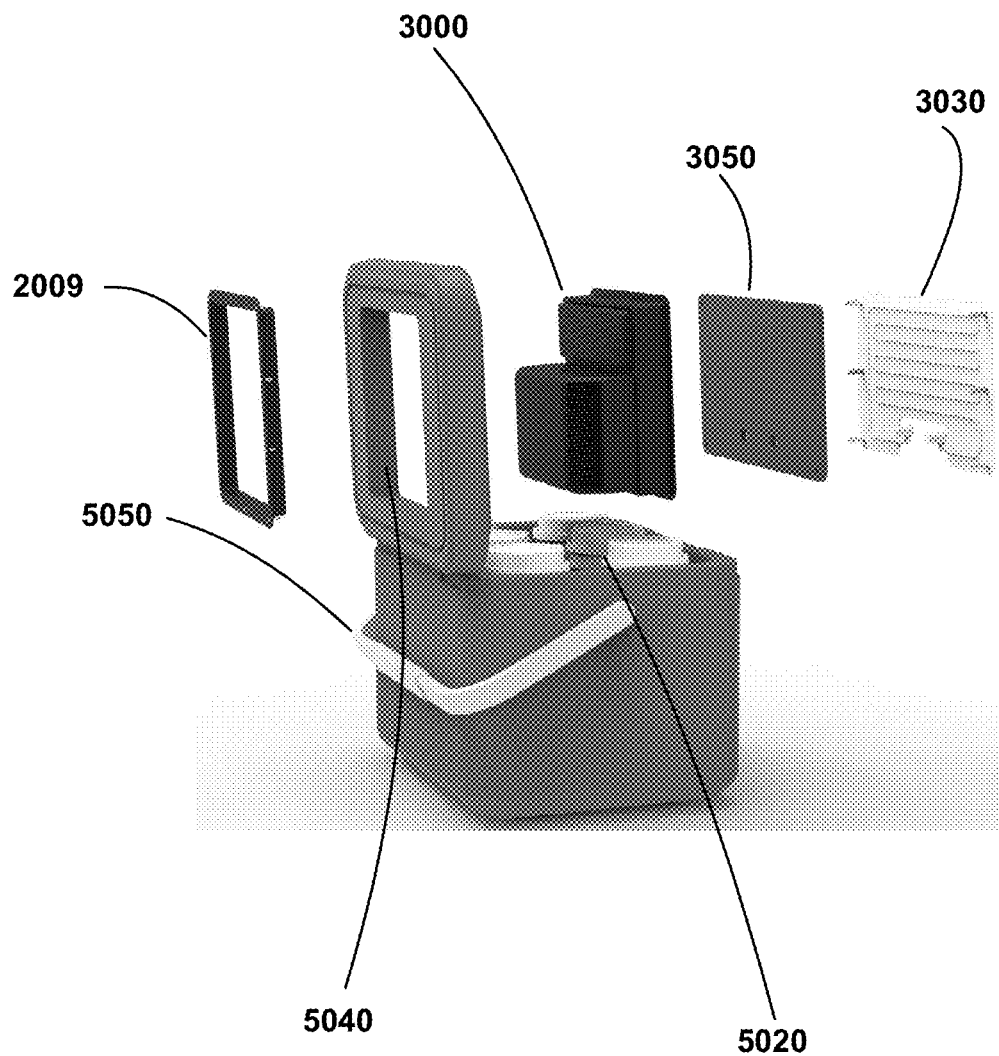
FIG. 9B shows for illustrative purposes only an example of an exploded view of a cold Coffee Caddy of one embodiment.

FIG. 9B shows for illustrative purposes only an example of an exploded view of a refrigerating module installed in the cover of a hot coffee caddy of one embodiment. FIG. 9B shows an exploded view of refrigerating module 3000 in vertical installation position module installed in the cover of a cold coffee caddy 5050 of one embodiment. Also showing are an installation cut out 5040, mounting flange 2009, insulating mount plate 3050, and evaporator plate 3030. Evaporator plate 3030 insulating mount plate 3050 and refrigerating module 3000 are directly connected and form a 1-piece module. The refrigerating module 3000 and evaporation plate allow temperature control between 5° and 40° F. The insulated box helps maintain the temperature for the transport of cold or frozen drinks.

Figure 10A:
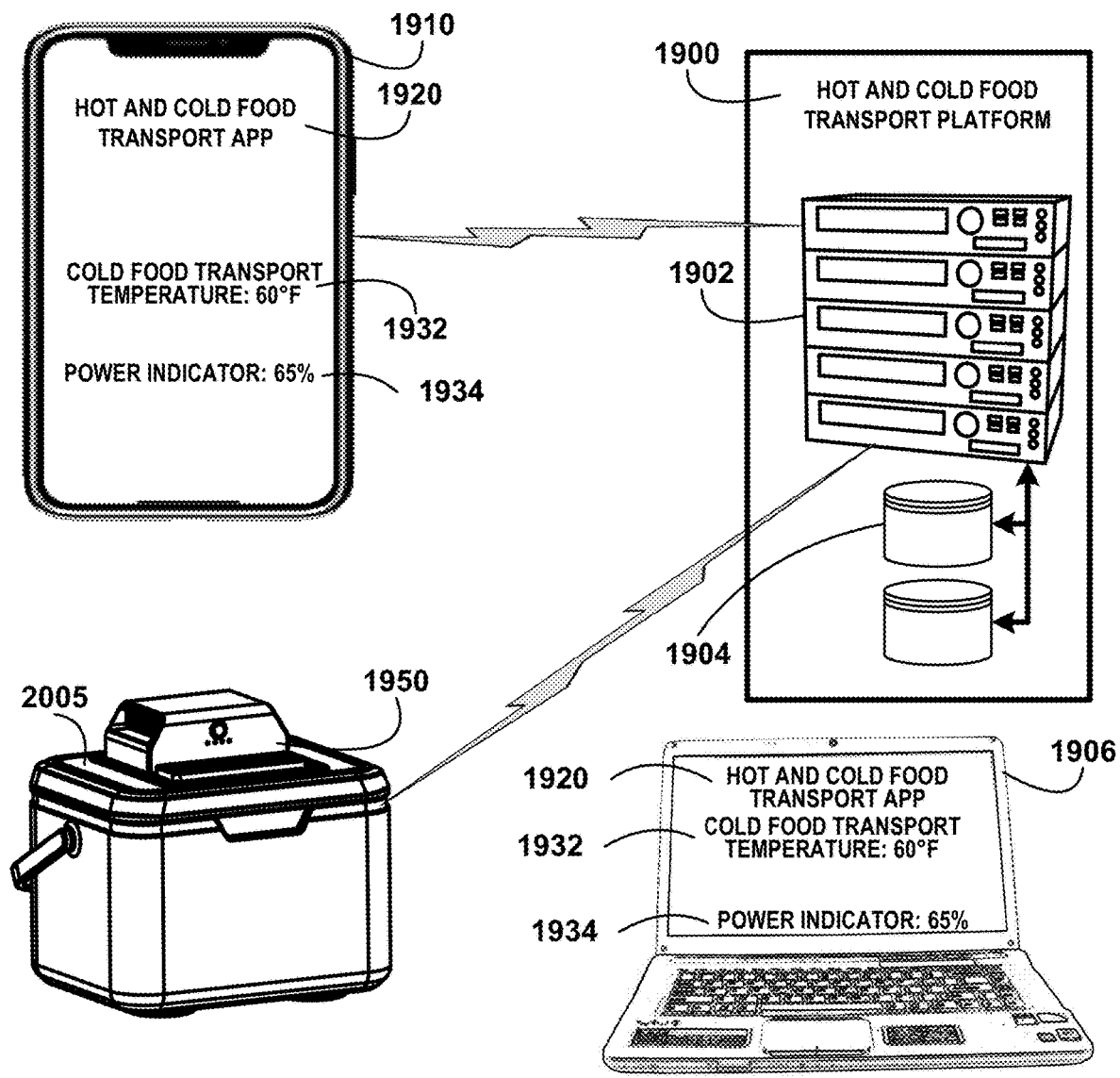
FIG. 10A shows for illustrative purposes only an example of a food transport crate wireless monitoring system of one embodiment.

A Food Transport Crate Wireless Monitoring System:

FIG. 10A shows for illustrative purposes only an example of a food transport crate wireless monitoring system of one embodiment. FIG. 10A shows a hot and cold food transport platform 1900 comprising a plurality of servers 1902, a plurality of databases 1904, and a platform computer 1906. The insulated box 2005 includes temperature sensors 1950 to monitor the temperature inside the insulated box 2005. The temperature sensors 1950 transmit the temperature continuously to maintain safe temperatures for the food contained within including, in this example, cold beverages. A user mobile device 1910 having a hot and cold food transport app 1920 installed on a user mobile device 1910 displays to the user the cold food transport temperature: 60° F. 1932 and power indicator: 65% 1934. A platform computer 1906 having a hot and cold food transport app 1920 displaying the cold food transport temperature: 60° F. 1932 and power indicator: 65% 1934 of one embodiment. In some embodiments, the cup holder may be substituted with stackable food trays.

Figure 10B:
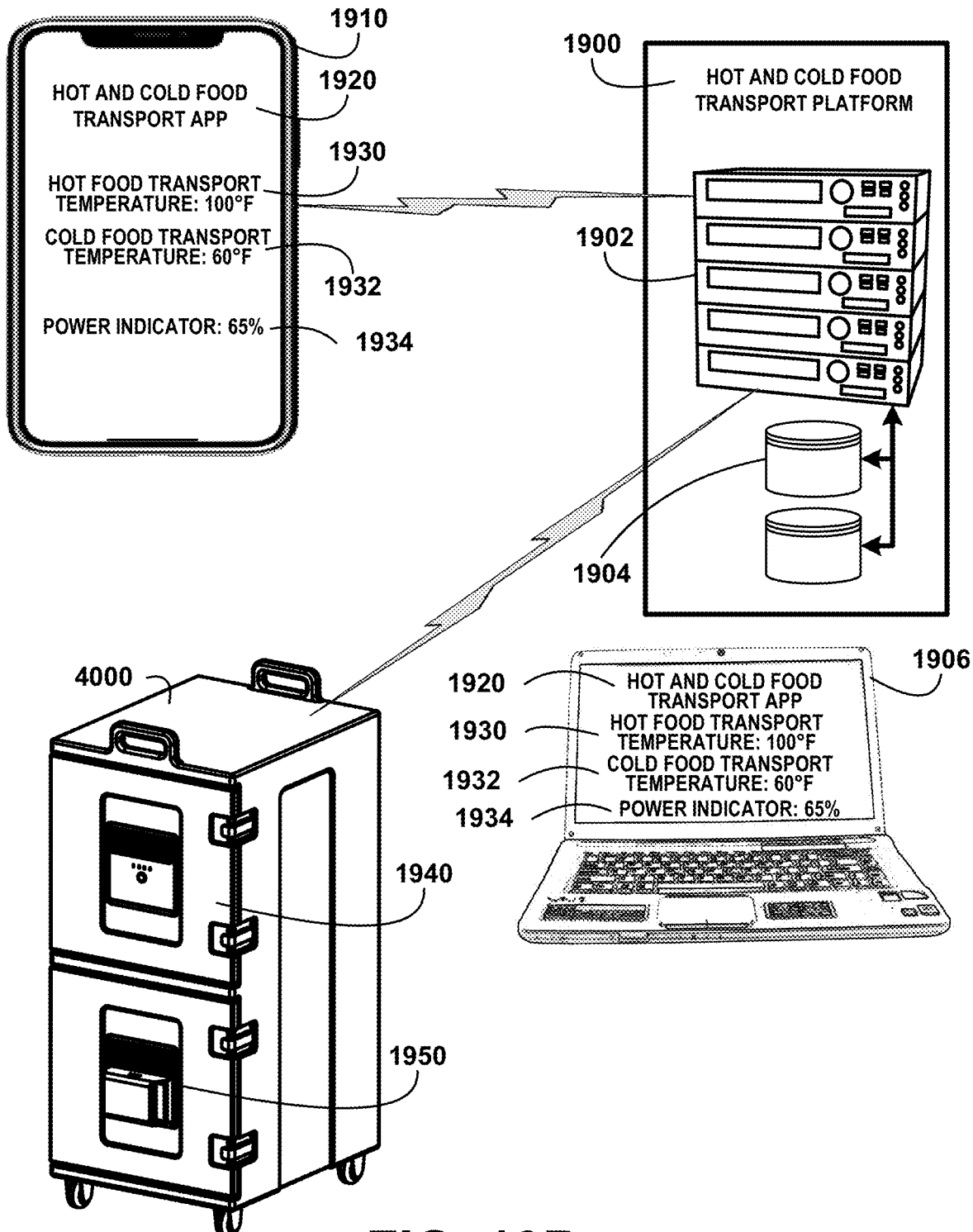
FIG. 10B shows for illustrative purposes only an example of a hot and cold food transport platform of one embodiment.

FIG. 10B shows for illustrative purposes only an example of a hot and cold food transport platform of one embodiment. FIG. 10B shows the hot and cold food transport platform 1900 comprising a plurality of servers 1902, a plurality of databases 1904, and a platform computer 1906. The food transport crate 4000 includes temperature sensors 1950 to monitor the temperature inside the food transport crate 4000. The temperature sensors 1950 transmit the temperature continuously to maintain safe temperatures for the food contained within including, in this example, cold beverages.

The battery pack 1110 of FIG. 1A can include sensors to monitor the battery charge that is coupled to the insulated box wireless monitoring systems of FIG. 10A and FIG. 10B. During transport the rechargeable batteries can use vehicle battery power to maintain an adequate charge to maintain correct temperatures. The sensors transmit monitored data to the hot and cold food transport platform 1900. The plurality of servers 1902 retransmit the data to a user's mobile device 1910. The user's mobile device 1910 has a hot and cold food transport app 1920 that displays a hot food transport temperature: 100° F. 1930 and a cold food transport temperature: 60° F. 1932 and the power indicator: 65% charge 1934. The APP also provides real time GPS location tracking with a route map, pin drops for stops that allow images and notes, weather conditions, date and time. Data is auto uploaded to cloud storage and easily reviewed through multiple filter options.

The platform computer 1906 using the hot and cold food transport app 1920 also displays a hot food transport temperature of 100° F. 1930 and a cold food transport temperature of 60° F. 1932 and the power indicator of FIG. 10A and FIG. 10B. As an example, the battery can show a 65% charge 1934, for example, at the food transport office, which allows personnel to communicate with a driver that the battery charge is nearing a critical level, which can compromise the temperature of the food being transported.

Figure 11A:
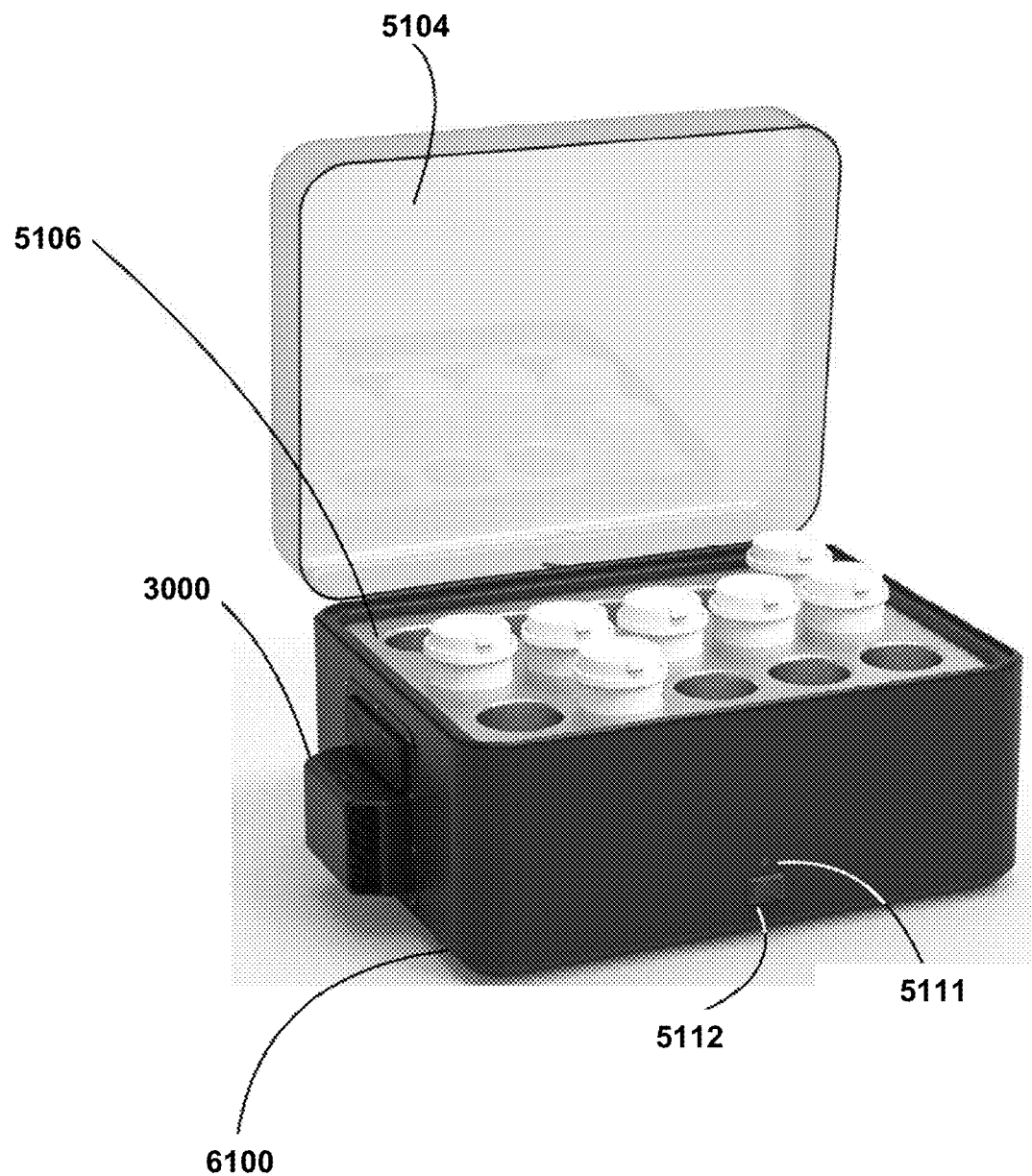
FIG. 11A shows for illustrative purposes only an example of a countertop refrigeration tray components of one embodiment.

A Countertop Refrigeration Tray:

FIG. 11A shows for illustrative purposes only an example of a countertop refrigeration tray components of one embodiment. FIG. 11A shows the countertop refrigeration tray 6100 components including a refrigerating module 3000, cup holder 5106, clear cover 5104, power switch 5112, and power indicator led 5111 of one embodiment. Countertop refrigeration tray can be powered by AC only in one embodiment or selectable AC or battery in another embodiment.

The countertop refrigeration tray 6100 with Power switch 5112 and Power indicator 5111. The refrigerating module 3000 is mounted to the side with cup holder 5106 nesting inside. The countertop cup refrigerating tray 6100 with a refrigeration module 3000, evaporator plate 3030, aluminum cup holder 5106.

The evaporator plate rests below the aluminum cup holders allowing temperature transfer directly to cups while also keeping the entire interior compartment at designated temperature.

Figure 11B:
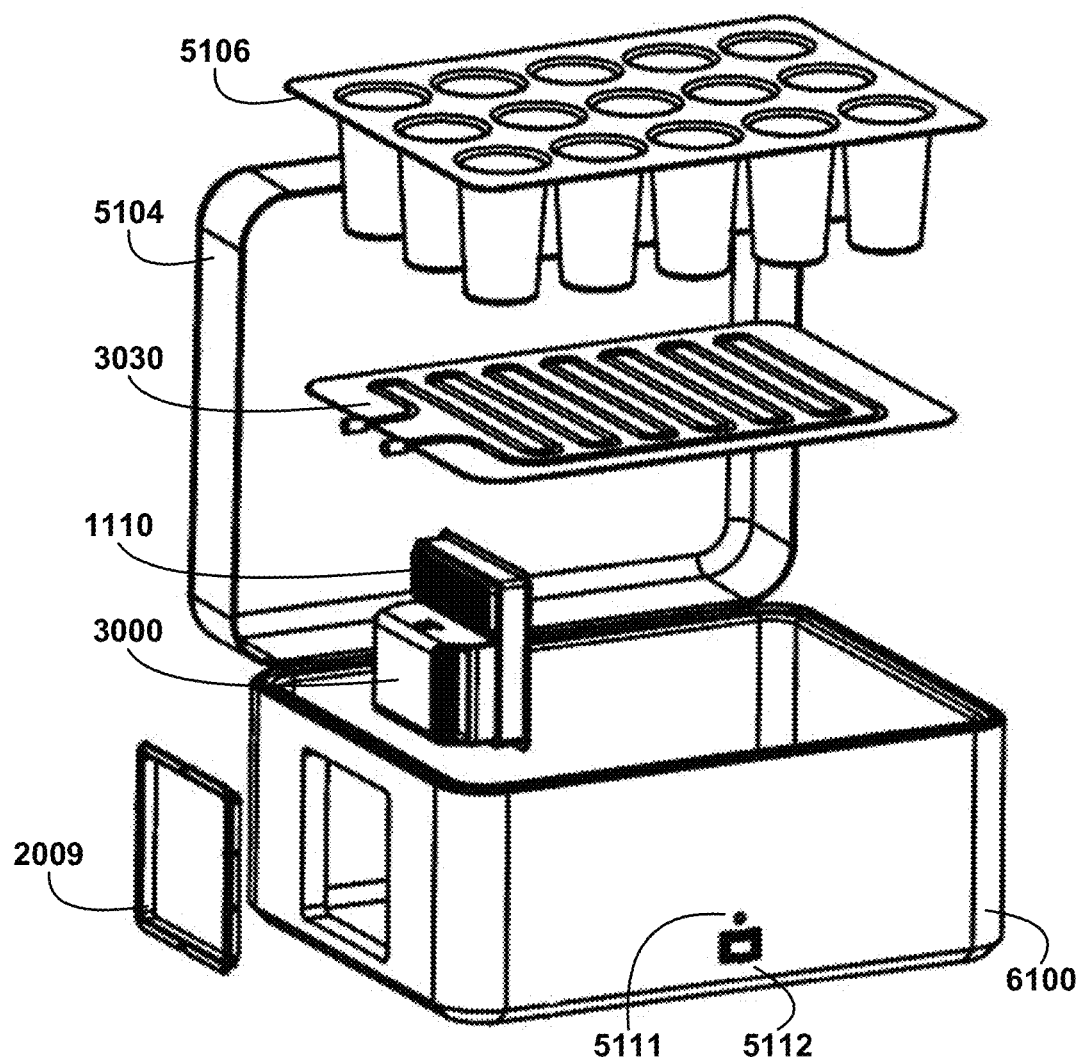
FIG. 11B shows for illustrative purposes only an example of an exploded view of the countertop refrigeration tray components of one embodiment.

FIG. 11B shows for illustrative purposes only an example of an exploded view of the countertop refrigeration tray components of one embodiment. FIG. 11B shows an exploded view of the countertop cooling tray 6100 including power switch 5112, power indicator LED 5111, mounting flange 2009, refrigerating module 3000, rechargeable battery pack 1110, evaporator plate 3030, clear cover 5104, and cup holder 5106 of one embodiment.

Figure 11C:
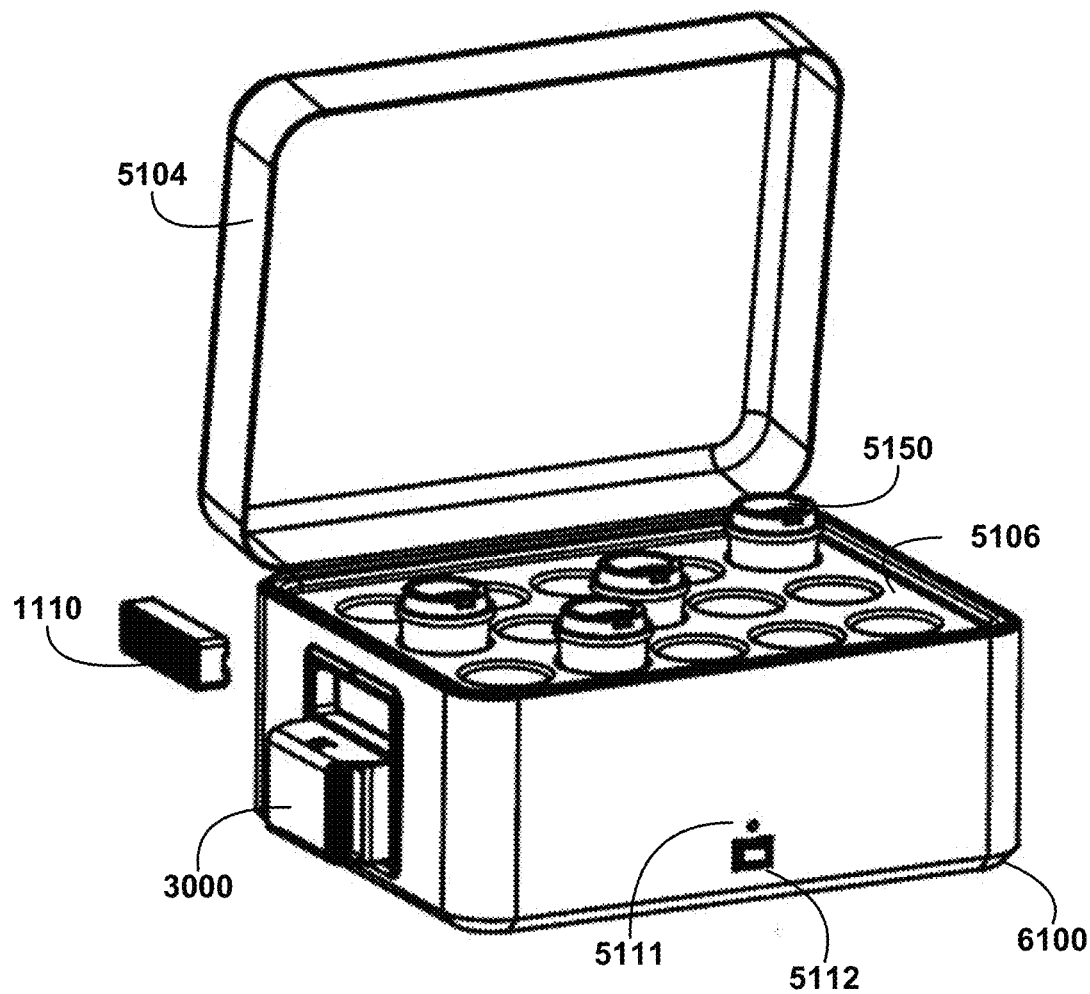
FIG. 11C shows for illustrative purposes only an example of a 15 cup countertop refrigeration tray components of one embodiment.

FIG. 11C shows for illustrative purposes only an example of a 15 cup countertop refrigeration tray components of one embodiment. FIG. 11C shows the countertop cooling tray 6100 including the power switch 5112, power indicator led 5111, refrigerating module 3000, rechargeable battery pack 1110, evaporator plate 3030, clear cover 5104, and cup holder 5106 with a 15 beverage container 5150 capacity of one embodiment. Other embodiments may utilize an insulated instead of clear cover.

Figure 11D:
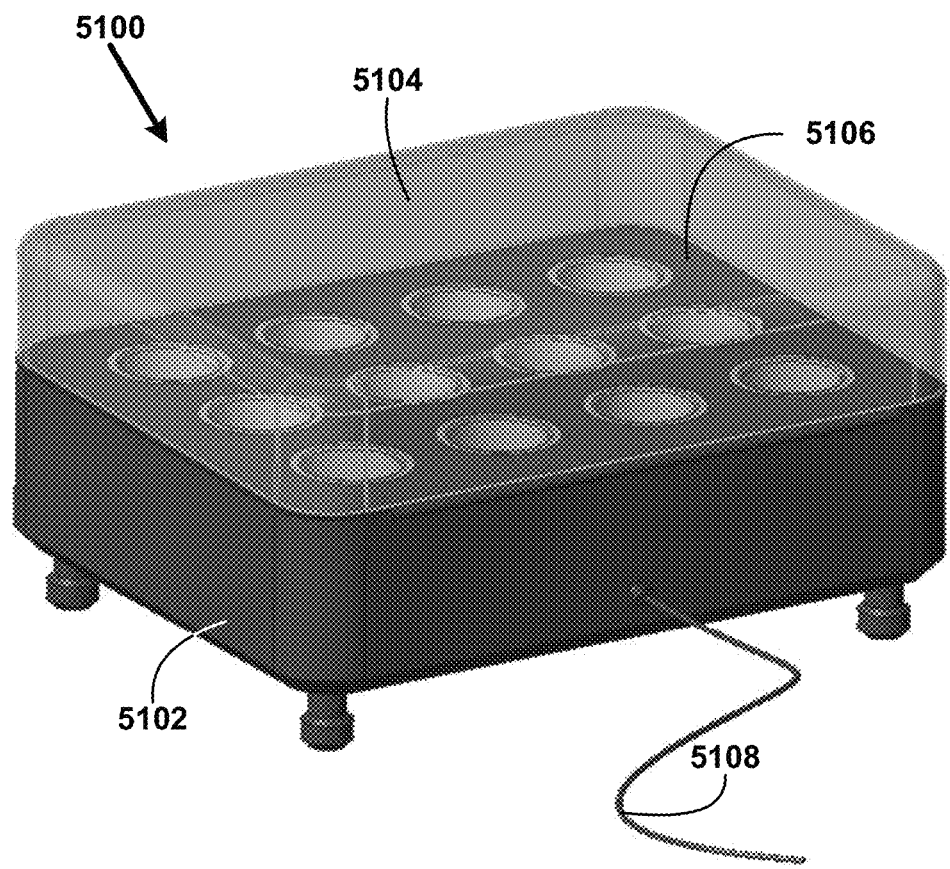
FIG. 11D shows for illustrative purposes only an example of a top view of a countertop cup heating tray of one embodiment.

FIG. 11D shows for illustrative purposes only an example of a top view of a countertop cup heating tray of one embodiment. FIG. 11D shows an external power countertop cup heating tray 5100 with a clear cover 5104 of one embodiment. Other embodiments may incorporate an insulated cover and battery power. A removable aluminum cup holder insert 5106 is installed in the countertop heating base box 5102 with an external power cord 5108. Cup holder with heat film wrapping 5106, is designed to keep drinks hot. The control PCBA is protected in a watertight lower compartment that serves as a base for the aluminum cup holders. Each cup holder is wrapped with a heat-transmitting film that transfers heat into the coffee to maintain hot temperatures. The insulated box helps retain heat.

Figure 12:
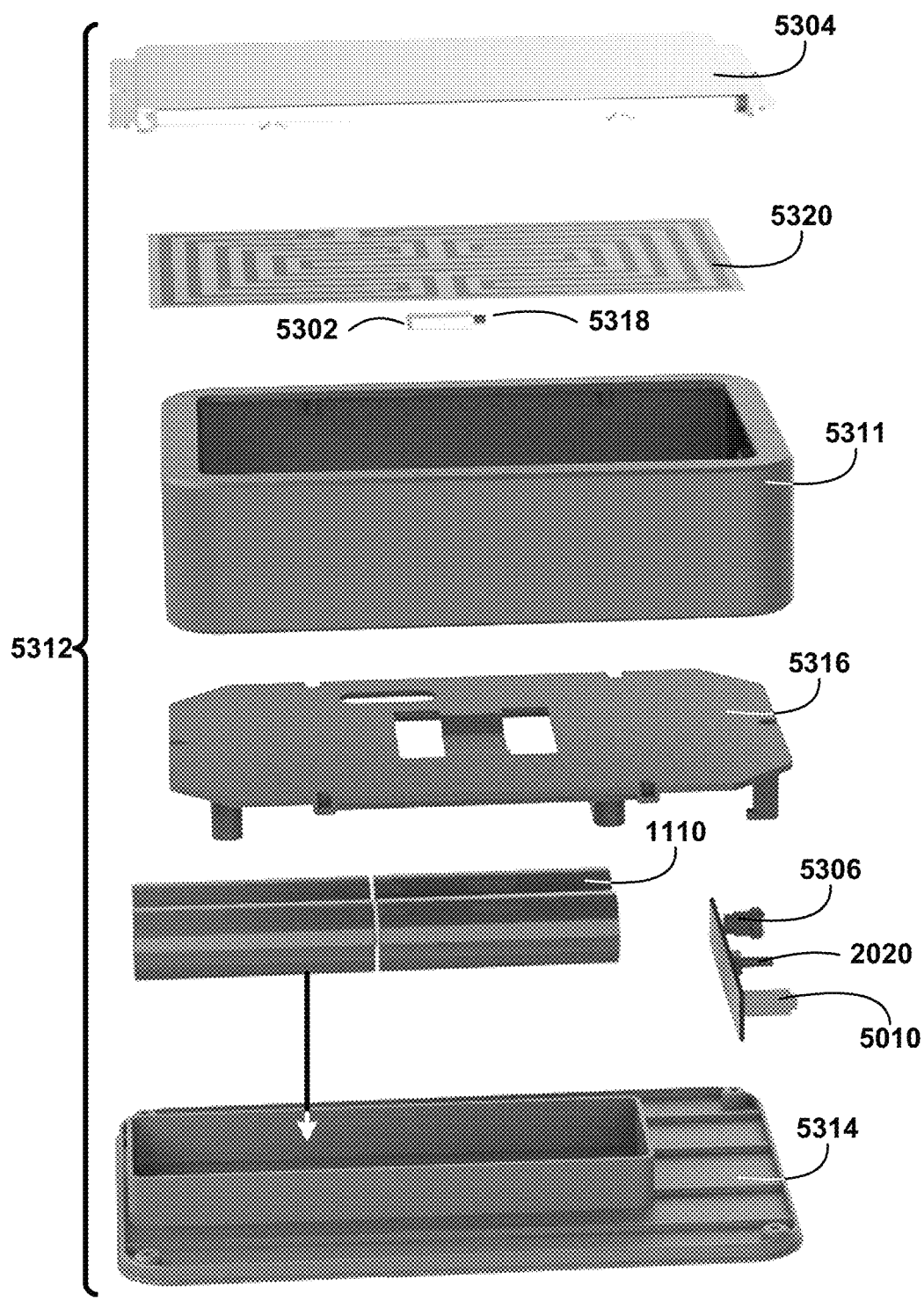
FIG. 12 shows for illustrative purposes only an example of a buffet warmer module components of one embodiment.

Buffet Warmer Temperature Control System Module Components:

FIG. 12 shows for illustrative purposes only an example of a buffet warmer module components of one embodiment. FIG. 12 shows a buffet warmer temperature control system module components 5312 housed within a main box container 5311. The components include a main box bottom with battery compartment 5314, charging port 5306, power button 2020, power indicator light 5010, rechargeable battery pack 1110, frame insulating connective plate 5316, internal master PCBA 5008 of FIG. 11, electrical connector 5318, heat generating plate 5320, and protective heating surface 5304 of one embodiment.

A rechargeable battery pack 1110 may include, for example, a lithium-ion rechargeable battery pack, a lithium polymer (LiPo) rechargeable battery, rechargeable aluminum-based batteries, rechargeable nickel-iron batteries, and other rechargeable battery types. The control printed circuit board assembly (PCBA) 5008 of FIG. 11 may include a plurality of printed circuits configured for differing functions including electronic components and circuits for controlling the various temperature control system operations as described above and in the following descriptions. The control printed circuit board assembly (PCBA) 5008 of FIG. 11 includes multiple safety systems for battery charging and operation of one embodiment.

Figure 13:
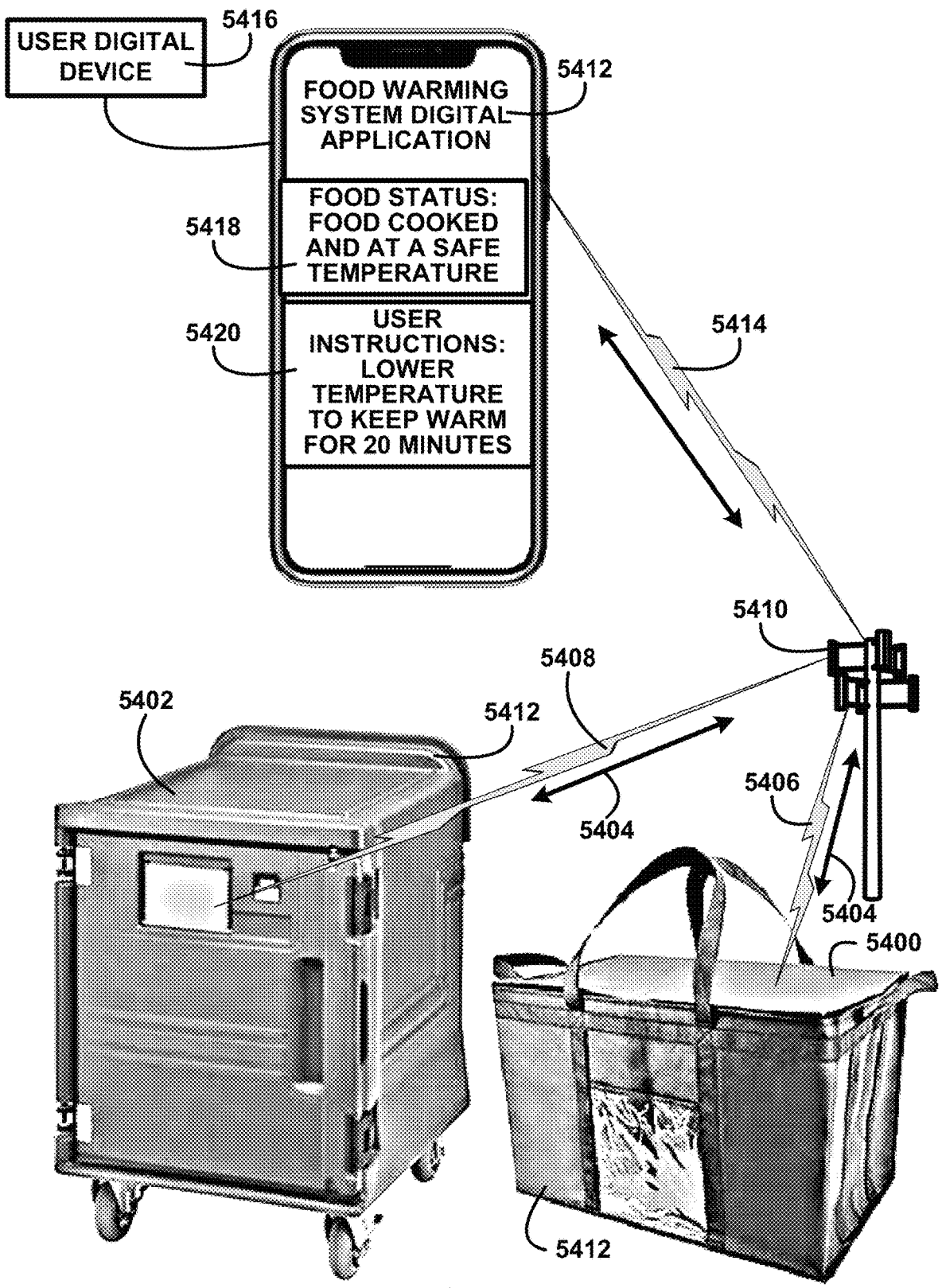
FIG. 13 shows for illustrative purposes only an example of a food warming system digital application of one embodiment.

Temperature Control System Digital Application:

FIG. 13 shows for illustrative purposes only an example of a temperature control system digital application of one embodiment. FIG. 13 shows transmitting food status information to a user and receiving user instructions from a user digital device 5416 using a temperature control system digital application 5412. The soft-sided food transport container 5400 temperature control system is coupled to the temperature control system digital application 5412 installed in the internal master PCBA 5008 of FIG. 11. The hard-sided rolling food transport container 5402 temperature control system is coupled to the temperature control system digital application 5412 installed in the internal master PCBA 5008 of FIG. 11 temperature control system bidirectional communication 5404 allows temperature control system digital application 5412 transmissions, for example, to a cell tower 5410, Bluetooth and WIFI connection to a user digital device 5416.

The temperature control system digital application 5412 includes the temperature control system digital application digital application bidirectional communication 5414. The temperature control system digital application digital application 5412 installed on the user digital device 5416 will display a food status: food cooked and at a safe temperature 5418. The user can transmit 5406 to the soft-sided rolling food transport container 5400 temperature control system user instructions and receive food status audible and visual alert broadcast from the soft-sided rolling food transport container 5400. The user can transmit 5408 to the hard-sided rolling food transport container 5402 temperature control system user instructions and receive food status audible and visual alert broadcast from the hard-sided rolling food transport container 5402. In one instance, the user instructions can be to lower the temperature to keep warm for 20 minutes 5420 before they arrive at the food and beverage transport container 5001 of FIG. 11 of one embodiment.

Figure 14:
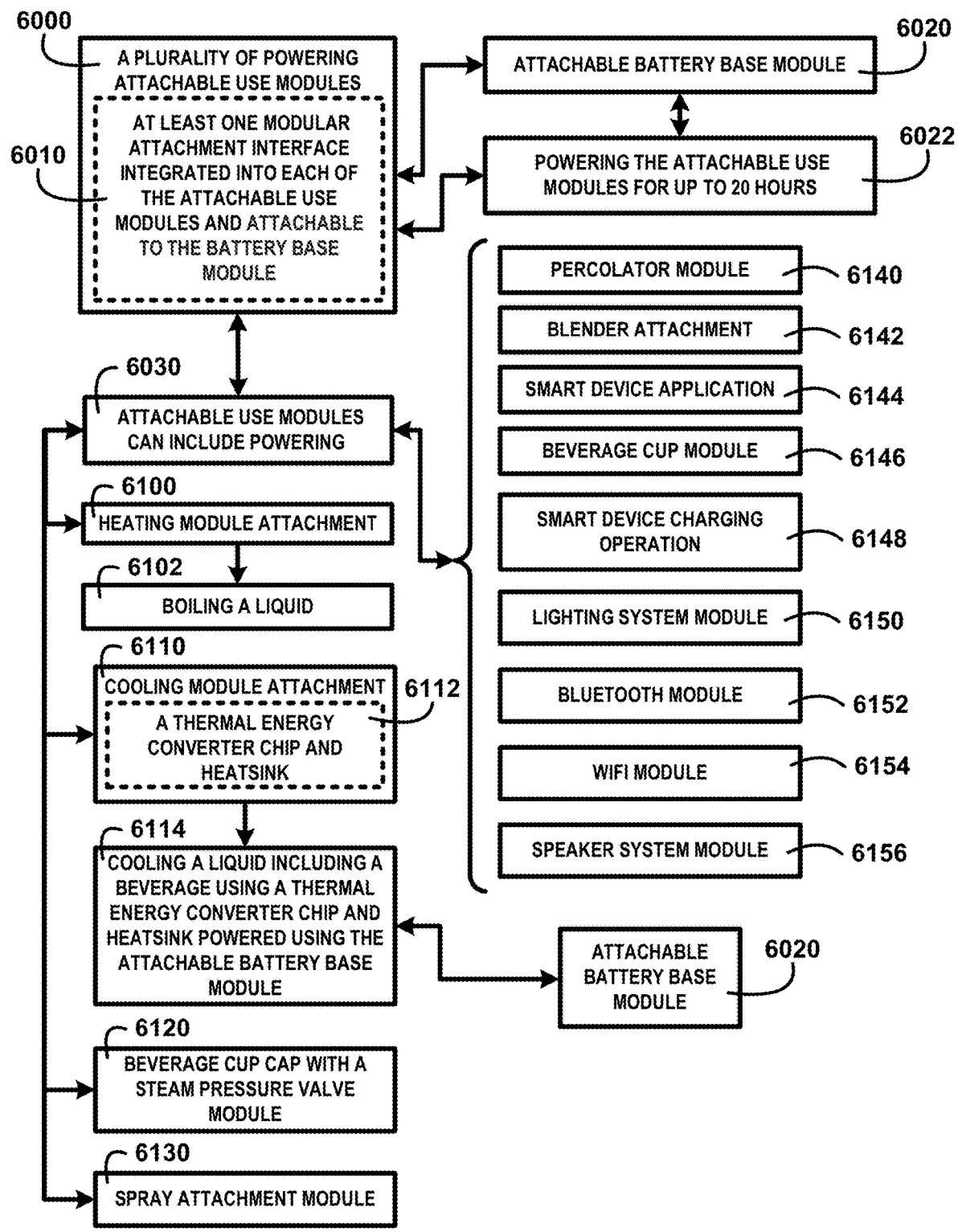
FIG. 14 shows a block diagram of an overview of powering attachable use modules of one embodiment.

The food system heating module 1100 of FIG. 1A includes a temperature control system digital application system digital application for installation on a user's digital device including, for example, a smartphone, tablet, laptop computer, and other digital devices. The temperature control system digital application installed on a user's digital device is configured for displaying the food status alerts on a digital screen and broadcasting audible food status alerts. The user can tap the temperature control system digital application digital application icon and receive intermediate food status alerts to check the current temperature and a calculated approximate time remaining for the food to reach a safe temperature. In one embodiment, the temperature control system digital application digital application may display the temperature selection controls of the chafer transportable temperature control system digital application module. This allows the user to set the desired temperature using the user's digital device. The user may want to turn off or adjust the temperature which they can perform using the temperature control system digital application of one embodiment. Powering Attachable Use Modules:

FIG. 14 shows a block diagram of an overview of powering attachable use modules of one embodiment. FIG. 14 shows a plurality of attachable use modules 6000 having at least one modular attachment interface integrated into each of the attachable use modules and attachable to the battery base module 6010. The attachable battery base module 6020 has the capacity for powering the attachable use modules for up to 20 hours 6022. The attachable use modules can include powering 6030 a heating module attachment 6100 for boiling a liquid 6102, a cooling module attachment 6110 having a Thermal Energy Converter chip and heatsink 6112 for cooling a liquid including a beverage using a Thermal Energy Converter chip and heatsink powered using the attachable battery base module 6114.

The attachable battery base module 6020 also provides powering other applications using a beverage cup cap with a steam pressure valve module 6120, spray attachment module 6130, percolator module 6140, blender attachment 6142, smart device application 6144, beverage cup module 6146, smart device charging operation 6148, lighting system module 6150, Bluetooth™ module 6152, WIFI module 6154, and speaker system module 6156 of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A modular temperature transport system for use with food being transported, comprising:
    a portable heating module removably located within a container and having a heating element integrated within the portable heating module and positioned at a distal end and a circulating fan integrated between the heating element and at least one removable battery and configured to draw internal air from an interior of the container and move the internal air from the container into and over the heating element and back into the container when activated;
    wherein the at least one removable rechargeable battery is coupled to the portable heating module at a proximate end, opposite the heating element, configured to provide power to the portable heating module, wherein the battery is a high-current and heat-resistant rechargeable battery;
    an adjustable outlet vent positioned on an external surface of the portable heating module adjacent to the heating element, wherein the adjustable outlet vent is configured to control the direction of the internal air circulation over the food; and
    at least one temperature sensor coupled to the portable heating module configured to continuously control a temperature of the heating element to maintain a predetermined safe food temperature of the food within the container;
    a temperature modulation control device coupled to the at least one temperature sensor configured to automatically modulate the power from the battery based on predetermined upper and lower temperature levels to extend runtime of the at least one removable battery.

2. The modular temperature transport system for use with food being transported of claim 1, further comprising an AC power adapter port coupled to the portable heating module, configured to access AC power to recharge the at least one removable rechargeable battery.

3. The modular temperature transport system for use with food being transported of claim 1, further comprising a 12V car power adapter device port coupled to the portable heating module, configured to connect a 12V car power adapter device power source to recharge the at least one removable rechargeable battery.

4. The modular temperature transport system for use with food being transported of claim 1, further comprising a high power charger, and high current connection port coupled to the portable modular heating system configured to connect to a high power and high current capacity power source configured to allow high power and high current capacity to effectively charge the at least one removable rechargeable battery.

5. The modular temperature transport system for use with food being transported of claim 1, further comprising a charger base having a high power charger and high current connection configured to allow additional power and current capacity to effectively charge at least one removable rechargeable battery simultaneously.

6. The modular temperature transport system for use with food being transported of claim 1, wherein the food within the container is at least one of a human consumable hot food.

7. The modular temperature transport system for use with food being transported of claim 1, further comprising the portable heating module and the portable cooling module mounted together and automatically switching to maintain a preset temperature at a safe temperature for the contents of the insulated container.

8. A modular temperature transport system for use with food being transported comprising:
    a portable heat module removably within a container and having a heating element integrated within the portable heating module and positioned at a distal end and a circulating fan integrated between the heating element and at least one removable battery and configured to draw internal air from an interior of the container move the internal air from the container into and over the heating element and back into the container when activated;
    wherein the at least one removable rechargeable battery coupled to the portable heating module at a proximate end, opposite the heating element, configured to provide power to the portable heating module, wherein the battery is a high current and heat-resistant rechargeable battery;
    an adjustable outlet vent positioned on an external surface of the portable heating module adjacent to the heating element, wherein the adjustable outlet vent is configured to control the direction of the internal air circulation over the food;
    at least one temperature sensor coupled to the portable heating module configured to continuously control a temperature of the heating element to maintain a predetermined safe food temperature of the food within the container that is over 140 degrees Fahrenheit; and
    a temperature modulation control device coupled to the at least one temperature sensor configured to automatically modulate the power from the battery based on predetermined upper and lower temperature levels to extend runtime of the at least one removable battery.

9. The modular temperature transport system for use with food being transported of claim 8, further comprising a 12V car power adapter device port coupled to the portable heating module, configured to connect a 12V car power adapter device power source to recharge the at least one removable rechargeable battery.

10. The modular temperature transport system for use with food being transported of claim 8, further comprising an AC power adapter port coupled to the portable heating module, configured to access AC power to recharge the at least one removable rechargeable battery.

11. The modular temperature transport system for use with food being transported of claim 8, further comprising a high power charger, and high current connection coupled to a high power and high current capacity power source configured to allow high power and high current capacity to effectively charge the at least one removable rechargeable battery.

12. The modular temperature transport system for use with food being transported of claim 8, wherein the food within the container is at least one of a human consumable hot food.

13. A modular temperature transport system for use with food being transported comprising:
   a portable heat module removably within a container and having a circulating fan configured to move internal air from the container over a heating element and back into the container when activated;
   at least one removable rechargeable heating battery coupled to the portable heating module at a proximate end, opposite the heating element, configured to provide power to the portable heating module, wherein the battery is a high current and heat-resistant rechargeable battery; and
   a heating element integrated within the portable heating module and positioned at a distal end, providing heat to maintain food at a safe temperature;
   a circulating fan integrated between the heating element and the removable battery, wherein the circulating fan is configured to draw warm air from the container interior;
   an outlet vent with adjustable louvers positioned on an external surface of the portable heating module adjacent to the heating element, wherein the louvers are configured to control the direction of reheated warm air circulation over the food and, wherein the outlet vent allows for manual or automatic adjustment of airflow direction to optimize heat distribution;
   at least one temperature sensor coupled to the portable heating module, configured to monitor the container internal temperature, wherein the temperature sensor continuously transmits temperature data to a temperature control assembly coupled to the portable heating module to regulate and maintain safe food temperatures within the container;
   a temperature modulation control device coupled to the at least one temperature sensor configured to automatically modulate the power from the battery based on predetermined upper and lower temperature levels to extend runtime of the at least one removable battery; and
   a transport app wirelessly coupled to the portable heat module configured to wirelessly monitor a power level of the at least one removable battery and a temperature of the heating element and to remotely control the circulating fan.

14. The modular temperature transport system for use with food being transported of claim 13, wherein the container is at least one of a group of containers including an insulated box, a non-insulated box, a bag capable of withstanding safe food temperatures, a cooler, or any container capable of withstanding safe food temperatures.

* * * * *